United States Patent
Chenumolu et al.

(10) Patent No.: US 12,328,599 B2
(45) Date of Patent: *Jun. 10, 2025

(54) GEOGRAPHICALLY REDUNDANT AND HIGH AVAILABILITY SYSTEM ARCHITECTURE FOR A HYBRID CLOUD CELLULAR NETWORK

(71) Applicant: DISH Wireless L.L.C., Littleton, CO (US)

(72) Inventors: Siddhartha Chenumolu, Ashburn, VA (US); Andrew Trujillo, Littleton, CO (US); Sundeep Goswami, Leesburg, VA (US); Ash Khamas, Goffstown, NH (US); Amit Pathania, Great Falls, VA (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/527,812

(22) Filed: Dec. 4, 2023

(65) Prior Publication Data
US 2024/0107333 A1 Mar. 28, 2024

Related U.S. Application Data

(63) Continuation of application No. 17/960,672, filed on Oct. 5, 2022, now Pat. No. 11,877,160.
(Continued)

(51) Int. Cl.
*H04W 16/24* (2009.01)
*H04L 9/40* (2022.01)
(Continued)

(52) U.S. Cl.
CPC ......... *H04W 16/24* (2013.01); *H04L 41/0895* (2022.05); *H04L 45/50* (2013.01);
(Continued)

(58) Field of Classification Search
None
See application file for complete search history.

(56) References Cited

U.S. PATENT DOCUMENTS 10,555,165 B2 * 2/2020 Shekhar ............... H04W 12/06
2004/0174900 A1 9/2004 Volpi et al.
(Continued)

FOREIGN PATENT DOCUMENTS

CN 107787571 A 3/2018

OTHER PUBLICATIONS

M. Ivezic, Introduction to 5G Core Service-Base Architecture Components, pp. 1-23, (Sep. 27, 2020).*
(Continued)

*Primary Examiner* — Christopher M Crutchfield
(74) *Attorney, Agent, or Firm* — Kilpatrick Townsend & Stockton LLP

(57) ABSTRACT

Various arrangements of hybrid cloud cellular network systems are presented herein. A cellular radio access network (RAN) that includes multiple base stations (BSs) can be in communication with a cloud computing platform. Multiple cloud-implemented national data center (NDC) instantiations can be present and executed on the cloud computing platform. Network functions (NFs) are executed within each cloud-implemented NDC instantiation on the cloud computing platform. The system further includes instances of a cellular network database function that updates each other instance of the cellular network database function across the NDC instantiations.

17 Claims, 11 Drawing Sheets

Related U.S. Application Data

(60) Provisional application No. 63/252,942, filed on Oct. 6, 2021.

(51) Int. Cl.
| | | |
|---|---|---|
| *H04L 41/0895* | (2022.01) | |
| *H04L 45/50* | (2022.01) | |
| *H04L 45/586* | (2022.01) | |
| *H04L 45/76* | (2022.01) | |
| *H04L 47/125* | (2022.01) | |
| *H04W 4/90* | (2018.01) | |
| *H04W 28/086* | (2023.01) | |
| *H04W 40/02* | (2009.01) | |
| *H04W 48/18* | (2009.01) | |
| *H04W 88/16* | (2009.01) | |

(52) U.S. Cl.
CPC ............ *H04L 45/586* (2013.01); *H04L 45/76* (2022.05); *H04L 47/125* (2013.01); *H04L 63/0272* (2013.01); *H04W 4/90* (2018.02); *H04W 28/0861* (2023.05); *H04W 40/02* (2013.01); *H04W 48/18* (2013.01); *H04W 88/16* (2013.01)

(56) References Cited

U.S. PATENT DOCUMENTS

| | | | |
|---|---|---|---|
| 2012/0259970 A1* | 10/2012 | Hu | H04W 4/20 709/224 |
| 2016/0080172 A1 | 3/2016 | Uberoy et al. | |
| 2017/0339600 A1 | 11/2017 | Roeland et al. | |
| 2020/0125389 A1 | 4/2020 | Palermo et al. | |
| 2020/0273314 A1* | 8/2020 | Bordeleau | H04W 40/36 |
| 2021/0044567 A1 | 2/2021 | Hu et al. | |
| 2021/0168653 A1* | 6/2021 | Arnold | H04W 28/0933 |
| 2021/0274266 A1 | 9/2021 | Lohmar et al. | |
| 2021/0329098 A1* | 10/2021 | Bartolomé Rodrigo | H04L 67/01 |
| 2021/0351997 A1 | 11/2021 | Luft et al. | |
| 2022/0078091 A1* | 3/2022 | Qiu | H04L 41/5012 |
| 2022/0103985 A1 | 3/2022 | Khasnabish et al. | |
| 2022/0272043 A1 | 8/2022 | Mishra et al. | |
| 2022/0311744 A1 | 9/2022 | Shevade et al. | |
| 2024/0031908 A1 | 1/2024 | Grewal et al. | |
| 2024/0196319 A1 | 6/2024 | Nakazato et al. | |
| 2024/0205522 A1 | 6/2024 | Spaas et al. | |
| 2024/0276301 A1 | 8/2024 | Zhu et al. | |
| 2024/0323089 A1 | 9/2024 | Baba | |

OTHER PUBLICATIONS

Author Unknown, Discussion on Context data stored in UDR, Doc No. C4-182061, pp. 1-2, (Year: 2018).*

M. Ivezic, Introduction to 5G Core Service-Base Architecture Components, Introduction to 5G Core Service-Based Architecture (SBA) Components, pp. 1-23, (Sep. 27, 2020).

China Mobile, Discussion on Context data stored in UDR, Doc No. C4-182061,3GPP TSG CT4 Meeting #83, pp. 1-2 (Year: 2018).

"Cloud Platform Reference Designs," O-RAN.WG6.CLOUD-REF-v02.00, 2021, 43 pages.

"O-RAN Working Group 1 Study on O-RAN Slicing," O-RAN. WG1.Study-on-O-RAN-Slicing-v02.00, Technical Report, 2020, 29 pages.

"Amazon Virtual Private Cloud: User Guide", Available online at: URL:https://web.archive.org/web/20170121164746/https://docs.aws.amazon.com/AmazonVPC/latest/UserGuide/vpc-ug.pdf, 2017, pp. 1-279.

* cited by examiner

GEOGRAPHICALLY REDUNDANT AND HIGH AVAILABILITY SYSTEM ARCHITECTURE FOR A HYBRID CLOUD CELLULAR NETWORK

CROSS-REFERENCE TO RELATED APPLICATION

This Application is a continuation of U.S. Non-Provisional patent application Ser. No. 17/960,672, filed on Oct. 5, 2022, which claims priority to U.S. Provisional Patent Application No. 63/252,942, entitled "Cellular Network Virtualization using Cloud Platforms," filed Oct. 6, 2021, the entire disclosure of which is hereby incorporated by reference for all purposes.

BACKGROUND

Telecommunications systems that rely on specialized hardware are conventionally organized into a hierarchal structure that includes a national data center (NDC) and multiple regional data centers (RDCs). Multiple instances of hardware that performs the same purpose could be installed in order to provide geographic redundancy (GR) and allow for high availability of the system as a whole. With the advent of network virtualization and open radio access network (O-RAN) systems, this conventional hardware-centric arrangement can be inefficient.

SUMMARY

Various embodiments are described related to a hybrid cloud cellular network system. In some embodiments, a hybrid cloud cellular network system is described. The system may comprise a cellular radio access network (RAN) comprising a plurality of base stations (BSs), each base station of the plurality of BSs comprising: one or more antennas, one or more radio units (RUs), and a distributed unit (DU). The system may comprise a plurality of national data centers (NDCs). The plurality of NDCs may be executed on a public cloud computing platform. The public cloud computing platform may be communicatively connected with the RAN at a plurality of locations. The system may comprise a plurality of network functions (NFs). An instance of each NF may be executed within each NDC of the plurality of NDCs on the public cloud computing platform. The system may comprise a cellular network database function. An instance of the cellular network database function may be executed within each NDC of the plurality of NDCs on the public cloud computing platform. Each instance of the cellular network database function may update each other instance of the cellular network database function across the plurality of NDCs.

Embodiments of such a system may include one or more of the following features: a first set of NDCs of the plurality of NDCs may be part of a first data center group region. A second set of NDCs of the plurality of NDCs may be part of a second data center group region. A third set of NDCs of the plurality of NDCs may be part of a third data center group region. The plurality of NFs may comprise: a network slice selection function (NSSF), a network exposure function (NEF), a security edge protection proxy (SEPP), a binding support function (BSF), a policy control function (PCF), a charging function (CHF), a service communication proxy (SCP), and a short message service function (SMSF). The system may further comprise a plurality of regional data centers (RDCs). At least one RDC of the plurality of RDCs may be implemented at a same data center group at which an NDC of the plurality of NDCs may be implemented and at least one RDC of the plurality of RDCs may be implemented at different data center group at which no NDC of the plurality of NDCs may be executed. Each RDC may implement a second plurality of NFs, comprising: an accessibility and mobility management function (AMF), a user plane function (UPF), and a session management function (SMF). Each NDC within a regional data center cluster may be communicatively coupled with each RDC within its data center group region. A first instance of a NF at a first NDC within the first data center group region may provide geographic redundancy for a second instance of the NF at a second NDC within the second data center group region. The system may further comprise plurality of edge data centers (EDC). Each EDC may be executed by a lower tier data center group than the plurality of NDCs and the plurality of RDCs. the cellular network database function is a universal data repository (UDR) that stores data for the plurality of NFs. The hybrid cloud cellular network system may be a 5G New Radio (NR) cellular network and a cellular network core of the hybrid cloud cellular network system may be 5G.

In some embodiments, a method for establishing geographic redundancy and high availability for a hybrid cellular network is described. The method may comprise establishing a plurality of national data centers (NDCs) on a public cloud computing platform. The public cloud computing platform may be communicatively connected with a radio access network (RAN) of the hybrid cellular network at a plurality of locations. The RAN may comprise a plurality of base stations (BSs), each BS of the plurality of BSs comprising: one or more antennas, one or more radio units (RUs), and a distributed unit (DU). The method may comprise executing, within each NDC of the plurality of NDCs, a plurality of network functions (NFs). The method may comprise executing, within each NDC of the plurality of NDCs, an instance of a cellular network database function on the public cloud computing platform. Each instance of the cellular network database function updates each other instance of the cellular network database function across the plurality of NDCs. The method may comprise processing cellular network core traffic for the RAN using the plurality of NDCs including the plurality of NFs and the cellular network database function.

Embodiments of such a method may include one or more of the following features: establishing the plurality of NDCs on the public cloud computing platform may comprise establishing a first set of NDCs of the plurality of NDCs as part of a first data center group region. Establishing the plurality of NDCs on the public cloud computing platform may comprise establishing a second set of NDCs of the plurality of NDCs as part of a second data center group region. Establishing the plurality of NDCs on the public cloud computing platform may comprise establishing a third set of NDCs of the plurality of NDCs as part of a third data center group region. The plurality of NFs may comprise: a network slice selection function (NSSF), a network exposure function (NEF), a security edge protection proxy (SEPP), a binding support function (BSF), a policy control function (PCF), a charging function (CHF), a service communication proxy (SCP), and a short message service function (SMSF). The method may further comprise establishing a plurality of regional data centers (RDCs) on the public cloud computing platform. Establishing the plurality of RDCs may comprise establishing at least one RDC of the plurality of RDCs at a same data center group at which an NDC of the plurality of NDCs may be implemented and establishing at least one RDC of the plurality of RDCs at a different data center group at which no NDC of the plurality of NDCs may be established. Each RDC may implement a second plurality of NFs, comprising: an accessibility and mobility management function (AMF), a user plane function (UPF), and a session management function (SMF). Each NDC within a regional data center cluster may be communicatively coupled with each RDC within its data center group region. A first instance of a NF at a first NDC within the first data center group region may provide geographic redundancy for a second instance of the NF at a second NDC within the second data center group region. The method may further comprise establishing a plurality of edge data centers (EDC) on the public cloud computing platform. Each EDC may be executed by a lower-tier data center group than the plurality of NDCs and the plurality of RDCs.

BRIEF DESCRIPTION OF THE DRAWINGS

The present disclosure is described in conjunction with the appended figures. In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Figure 1:
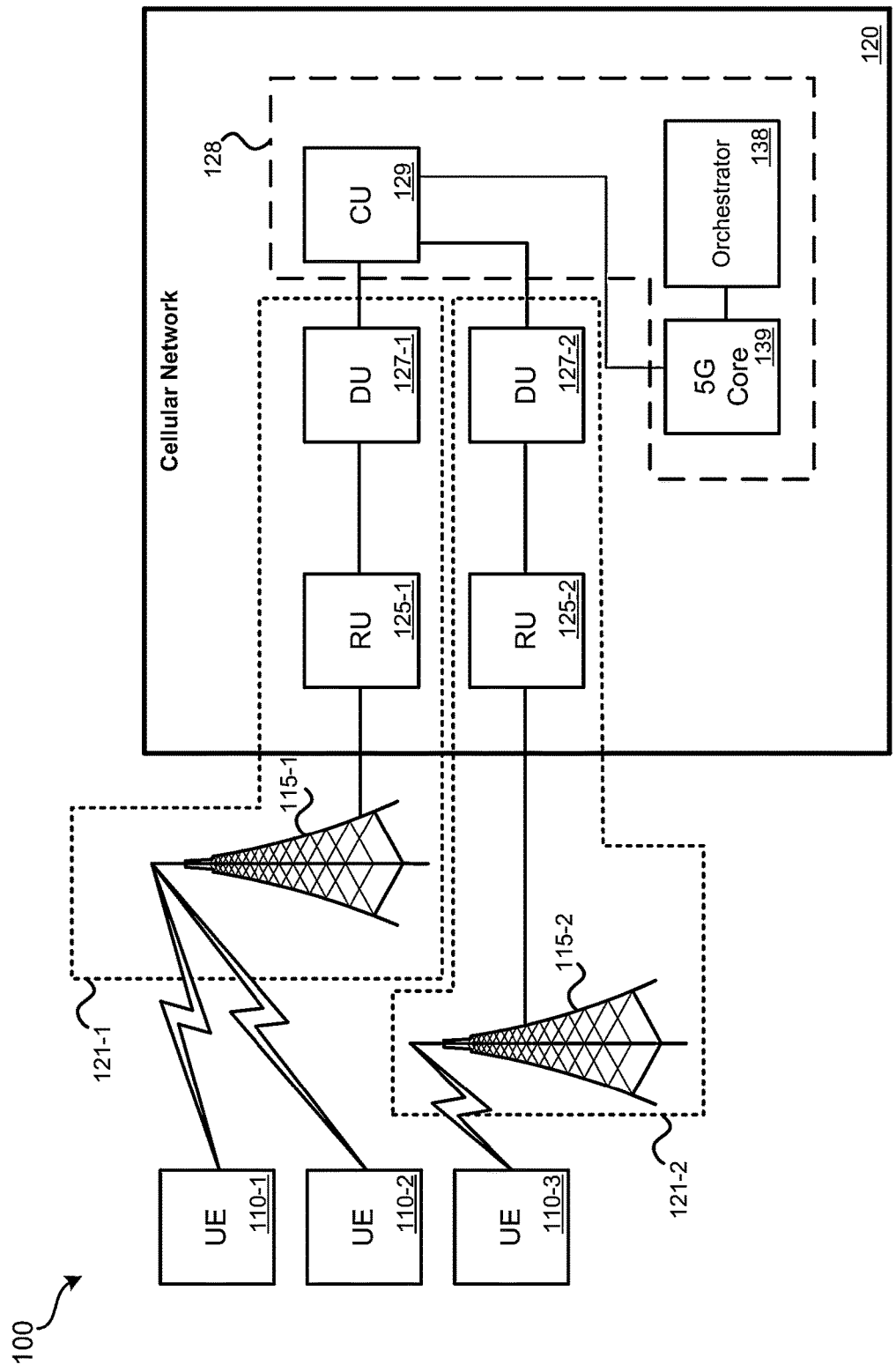
FIG. 1 illustrates an embodiment of a hybrid cloud cellular network system.

A hybrid cellular network (HCN) relies on a mixture of specialized hardware, general-purpose computing hardware combined with network functions (NFs) implemented as software, and one or more cloud computing platforms on which various cellular network functions are executed. At a high level, the radio access network (RAN) of the HCN is connected with a public cloud computing platform (PCCP). A public cloud computing platform refers to a cloud computing platform on which many clients operate virtual private clouds (VPCs) on a hardware platform maintained by a separate entity, such as Amazon Web Services (AWS). Some NFs are implemented locally at base stations (BSs) of the RAN, such as distributed units (DUs). Such an arrangement involving NFs being operated on hardware owned and operated by the cellular network provider can be referred to as a private cloud. Other, higher level network functions, which can logically be part of the RAN, such as centralized units (CUs) or logically part of the cellular network core (e.g., a national data center), such as user plane functions (UPFs), can be implemented on the PCCP. The hardware for the PCCP can be operated and maintained by an entity separate from the HCN and can allow many clients (in addition to the client that operates the HCN) to reserve and use resources of the PCCP, but maintain separate VPCs, thus isolating each entity's data from other entities.

Implementing NFs on the PCCP has significant advantages, including the ability to quickly scale implementations of NFs as needed by leveraging the large amounts of computing resources available on the PCCP. While in a conventional cellular network, redundant hardware systems may be implemented in a geographic region in order to provide geographic redundancy (GR) and high availability (HA), GR and HA may need to be achieved differently on a PCCP. Therefore, while a cellular network provider that is implementing an HCN still requires GR and HA, these requirements cannot be achieved using conventional arrangements.

Various embodiments detailed herein are directed to how to achieve GR and HA on a CCP for an HCN. The structure of the PCCP can be leveraged to implement functions associated with instances of national data centers (NDCs) of the cellular network at one level of the CCP, while regional data centers (RDCs) are implemented at another level of the PCCP, with each level associated with a different class of data center (DC) of the PCCP. The HCN may require that data of the HCN be available over its entire geographic footprint to accommodate user equipment (UE) movement. Therefore, a database function may be maintained across the NDCs of the HCN that remains synchronized across each NDC. Instantiations of the same functions may be present in each NDC, each of which may be in communication with RDCs in a particular region. RDCs may implement additional NFs, such as UPFs. Additionally, one or more edge data centers (EDCs) may be present, that function as an additional layer to provide enhanced service in particular geographic regions, such as by hosting a UPF or other NFs for a particular geographic region.

Across an NDC implemented across multiple availability zones, some NFs can serve as being in a standby state, such that if another NF within the region fails or experiences high load, cellular network core traffic can be diverted to the standby NF, with the standby NF having access to the same database NF as the NF experiencing the high load or failure. Alternatively, NFs across multiple NDCs may both be active and load balancing may be performed among the NFs. Such arrangements help ensure GR and HA across NFs of the NDCs, RDCs, and the HCN as a whole.

Embodiments detailed herein are also directed to how to effectively aggregate RAN upstream and downstream traffic to BSs in order to accommodate a limited number of connections with the PCCP. Connections with the PCCP may only be available in particular locations. A cellular network, however, requires a large number of geographically scattered BSs irrespective of where the PCCP connections are available. Further, connecting individual BSs directly to the CCP, such as from a network architecture or cost perspective, may not be practical. Embodiments detailed herein pair physical hardware operated by the cellular network provider to aggregate connections with a large number of BSs. This architecture can be used to handle geographic regions where no connection with the PCCP is available.

While the physical RAN components of the hybrid cellular network can use physical routers, on the PCCP, virtual routers may be implemented. These virtual routers effectively function like the physical routers, but are implemented as software executed on the CCP. To bridge the connection between the CCP and the hardware of the RAN, multiple transit gateways (TGs) may be implemented. A first transit gateway can be implemented at a DC operated by the hybrid cellular network operator and a second transit gateway can be implemented at the DC of the CCP with which the DC operated by the hybrid cellular network operator is physically connected. These TGs can serve as firewalls to ensure that only whitelisted traffic is exchanged between the TGs and a protocol conversion may be performed to allow the physical routers of the RAN to communicate with the virtual routers present on the CCP.

PCCPs can also allow for multiple instances of a service, such as a network function, to be efficiently executed in different locations. A PCCP can allow for subnets to be defined. A subnet can refer to a particular range of IP addresses for a client's virtual private cloud (VPC) on the PCCP. NFs of the HCN can be executed in a particular subnet, which causes the NF to be executed in a particular data center or group of data centers of the PCCP. By instantiating a same NF across multiple subnets with a region and controlling communication among NFs using virtual routers, load balancing and failover at a packet level can be accomplished. Such an arrangement allows for HA within a region.

These and other embodiments are detailed in relation to the figures. FIG. 1 illustrates a block diagram of a hybrid cellular network system ("system 100"). Such a hybrid cellular network system is partially implemented using specialized hardware and partially implemented using virtualized cellular network components on a public and/or private cloud computing platform, such as AWS (public cloud) or VMWare (private cloud). System 100 can include a 5G New Radio (NR) cellular network, but other types of cellular networks, such as 6G, 7G, etc., may also be possible. System 100 can include: UE 110 (UE 110-1, UE 110-2, UE 110-3); structure 115; cellular network 120; radio units 125 ("RUs 125"); distributed units 127 ("DUs 127"); centralized unit 129 ("CU 129"); 5G core 139; and orchestrator 138. FIG. 1 represents a component-level view. In a virtualized open radio access network (O-RAN), because components can be implemented as specialized software executed on general-purpose hardware, except for components that need to receive and transmit RF, the functionality of the various components can be executed by general-purpose servers. The hardware of the cloud-computing platform may be maintained by a separate cloud-service computing platform provider. Therefore, the cellular network operator may operate some hardware for the private cloud, such as local computing resources on which DUs are executed; such components may be in communication with a PCCP on which other cellular network functions, such as the cellular network core and higher-level RAN components, such as CUs, are executed. Therefore, many connections may exist between components of the RAN of the hybrid cellular network and the PCCP.

UE 110 can represent various types of end-user devices, such as cellular phones, smartphones, cellular modems, cellular-enabled computerized devices (e.g., laptop computers), sensor devices, robotic equipment, IoT devices, gaming devices, access points (APs), or any computerized device capable of communicating via a cellular network. More generally, UE can represent any type of device that has an incorporated 5G interface, such as a 5G modem. Examples can include sensor devices, Internet of Things (IoT) devices, manufacturing robots, unmanned aerial (or land-based) vehicles, network-connected vehicles, etc. Depending on the location of individual UEs, UE 110 may use RF to communicate with various BSs of cellular network 120. As illustrated, two BSs are illustrated: BS 121-1 can include: structure 115-1, RU 125-1, and DU 127-1. Structure 115-1 may be any structure to which one or more antennas (not illustrated) of the BS are mounted. Structure 115-1 may be a dedicated cellular tower, a building, a water tower, or any other man-made or natural structure to which one or more antennas can reasonably be mounted to provide cellular coverage to a geographic area. Similarly, BS 121-2 can include: structure 115-2, RU 125-2, and DU 127-2.

Real-world implementations of system 100 can include many (e.g., thousands) of BSs and many CUs and 5G core 139. BS 121-1 can include one or more antennas that allow RUs 125 to communicate wirelessly with UEs 110. RUs 125 can represent an edge of cellular network 120 where data is transitioned to RF for wireless communication. The radio access technology (RAT) used by RU 125 may be 5G NR, or some other RAT. The remainder of cellular network 120 may be based on an exclusive 5G architecture, a hybrid 4G/5G architecture, or some other cellular network architecture that supports cellular network slices. BS 121 may include an RU (e.g., RU 125-1) and a DU (e.g., DU 127-1).

One or more RUs, such as RU 125-1, may communicate with DU 127-1. As an example, at a possible cell site, three RUs may be present, each connected with a DU. Different RUs may be present for different portions of the spectrum. For instance, a first RU may operate on the spectrum in the citizens broadcast radio service (CBRS) band while a second RU may operate on a separate portion of the spectrum, such as, for example, band 71. In some embodiments, an RU can also operate on three bands. One or more DUs, such as DU 127-1, may communicate with CU 129. Collectively, an RU, DU, and CU create a gNodeB, which serves as the radio access network (RAN) of cellular network 120. DUs 127 and CU 129 can communicate with 5G core 139. The specific architecture of cellular network 120 can vary by embodiment. Edge cloud server systems (not illustrated) outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

While FIG. 1 illustrates various components of cellular network 120, other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In a virtualized arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible virtualized implementation, CU 129, 5G core 139, and/or orchestrator 138 can be implemented virtually as software being executed by general-purpose computing equipment on cloud-computing platform 128, as detailed herein. Therefore, depending on needs, the functionality of a CU, and/or NFs of the 5G core may be implemented locally to each other and/or specific functions of any given component can be performed by physically separated server systems (e.g., at different DCs). For example, some functions of a CU may be located at a same DC as where NFs of 5G core 139 are executed, while other NFs are executed at a separate DC or on a separate cloud computing system. In the illustrated embodiment of system 100, public cloud-computing platform 128 can execute CU 129, 5G core 139, and orchestrator 138. As examples, 5G core 139 can include NFs such as: a session management function (SMF), a network repository function (NRF), a charging function (CHF), a policy control function (PCF), a unified data management (UDM) function, an authentication server function (AUSF), and an accessibility and mobility management function (AMF). The cloud-computing platform 128 can be a third-party cloud-based computing platform or a cloud-based computing platform operated by the same entity that operates the RAN. Public cloud computing platform 128 may have the ability to devote additional hardware resources to cloud-based cellular network components or implement additional instances of such components when requested.

Kubernetes, Docker®, or some other container orchestration platform, can be used to create and destroy the logical CU or 5G core NFs and subunits as needed for the cellular network 120 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed on the cloud computing platform to meet or attempt to meet service level agreements (SLAs) across slices of the cellular network.

Orchestrator 138 can allow for the instantiation of new cloud-based components of cellular network 120. As an example, to instantiate a new CU for test, orchestrator 138 can perform a pipeline of calling the CU code from a software repository incorporated as part of, or separate from cellular network 120; pulling corresponding configuration files (e.g. helm charts); creating Kubernetes nodes/pods; loading CU containers; configuring the CU; and activating other support functions (e.g. Prometheus, instances/connections to test tools).

As previously noted, a cellular network slice functions as a virtual network operating on an underlying physical cellular network. Operating on cellular network 120 is some number of cellular network slices, such as hundreds or thousands of network slices. Communication bandwidth and computing resources of the underlying physical network can be reserved for individual network slices, thus allowing the individual network slices to reliably meet defined SLA requirements. By controlling the location and amount of computing and communication resources allocated to a network slice, the QoS and QoE for UE can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable. Particular parameters that can be set for a cellular network slice can include: uplink bandwidth per UE; downlink bandwidth per UE; aggregate uplink bandwidth for a client; aggregate downlink bandwidth for the client; maximum latency; access to particular services; and maximum permissible jitter. Particular network slices may only be reserved in particular geographic regions. For instance, a first set of network slices may be present at RU 125-1 and DU 127-1, and a second set of network slices, which may only partially overlap or may be wholly different from the first set, may be reserved at RU 125-2 and DU 127-2.

Further, particular cellular network slices may include multiple defined slice layers. Each layer within a network slice may be used to define parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2:
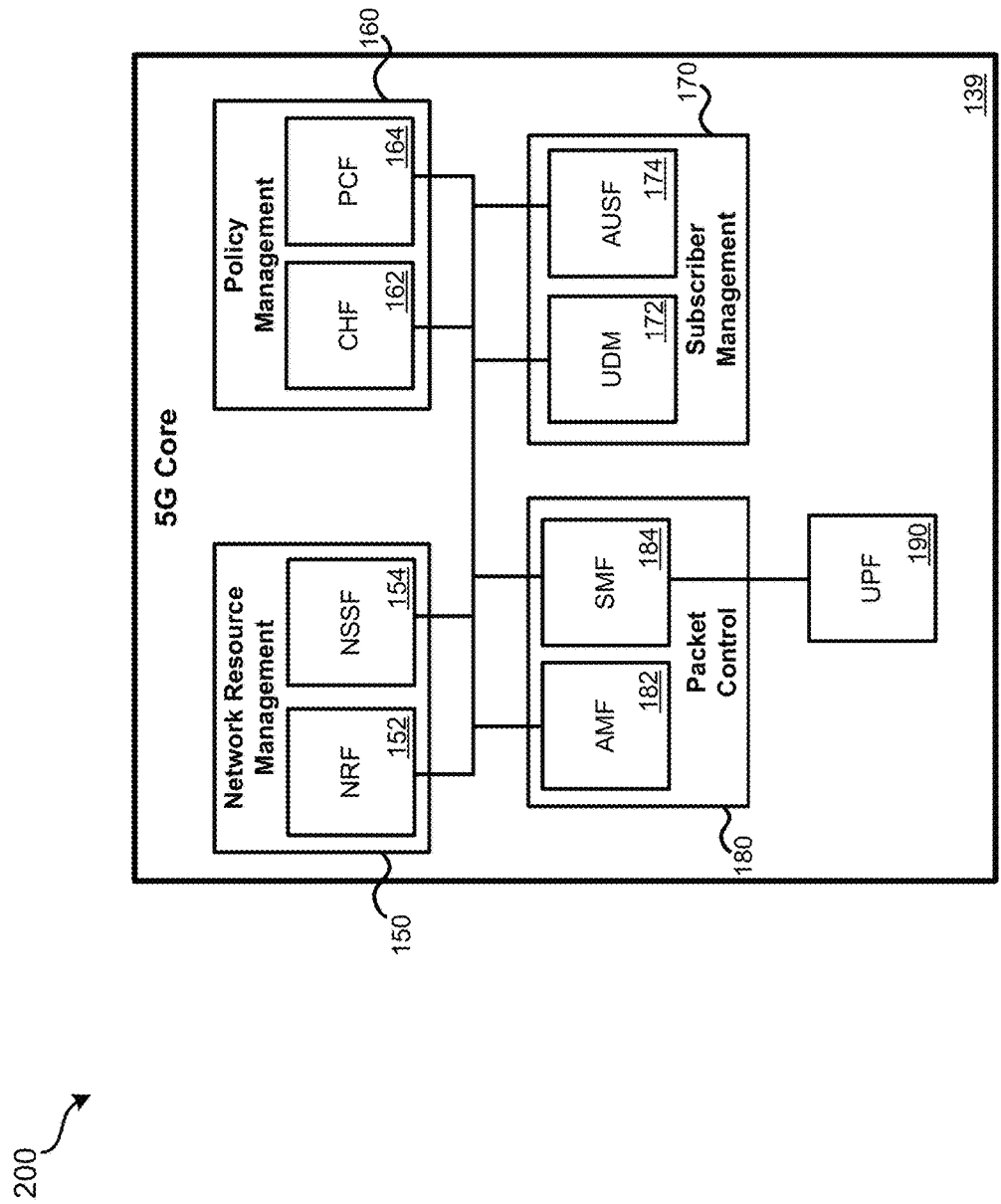
FIG. 2 illustrates an embodiment of a cellular network core.

FIG. 2 illustrates a block diagram 200 of a cellular network core, which can represent 5G core 139. 5G core 139 as a whole or individual NFs can be implemented on a PCCP. 5G core 139 can be physically distributed across DCs and can perform various core functions of the cellular network. 5G core 139 can include: network resource management components 150; policy management components 160; subscriber management components 170; and packet control components 180. Individual NFs of a cellular network may communicate using a bus-based communication architecture, thus allowing various components of 5G core 139 to communicate with each other directly. For the purposes of this document, 5G core 139 is simplified to show some key NFs. Implementations can involve many additional or alternative NFs.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. Converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection- and session-related information from UE and is responsible for handling connection and mobility management tasks. SMF 184 is responsible for interacting with the decoupled data plane, creating updating, and removing Protocol Data Unit (PDU) sessions, and managing session context with the User Plane Function (UPF). User plane function (UPF) 190 can be responsible for packet routing and forwarding, packet inspection, QoS handling, and external PDU sessions for interconnecting with a data network (DN) 195 (e.g., the Internet).

Each of these NFs are logically part of a 5G core 139. However, multiple instances of various NFs may be present in order to handle a large amount of traffic across the hybrid cellular network and to provide GR and HA. While FIG. 2 illustrates the logical structure of 5G core 139, FIGS. 3A and 3B address how such NFs can be implemented on a PCCP in order to realize GR and HA.

In some embodiments, a private cloud computing platform may be used as opposed to a public cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Figure 3A:
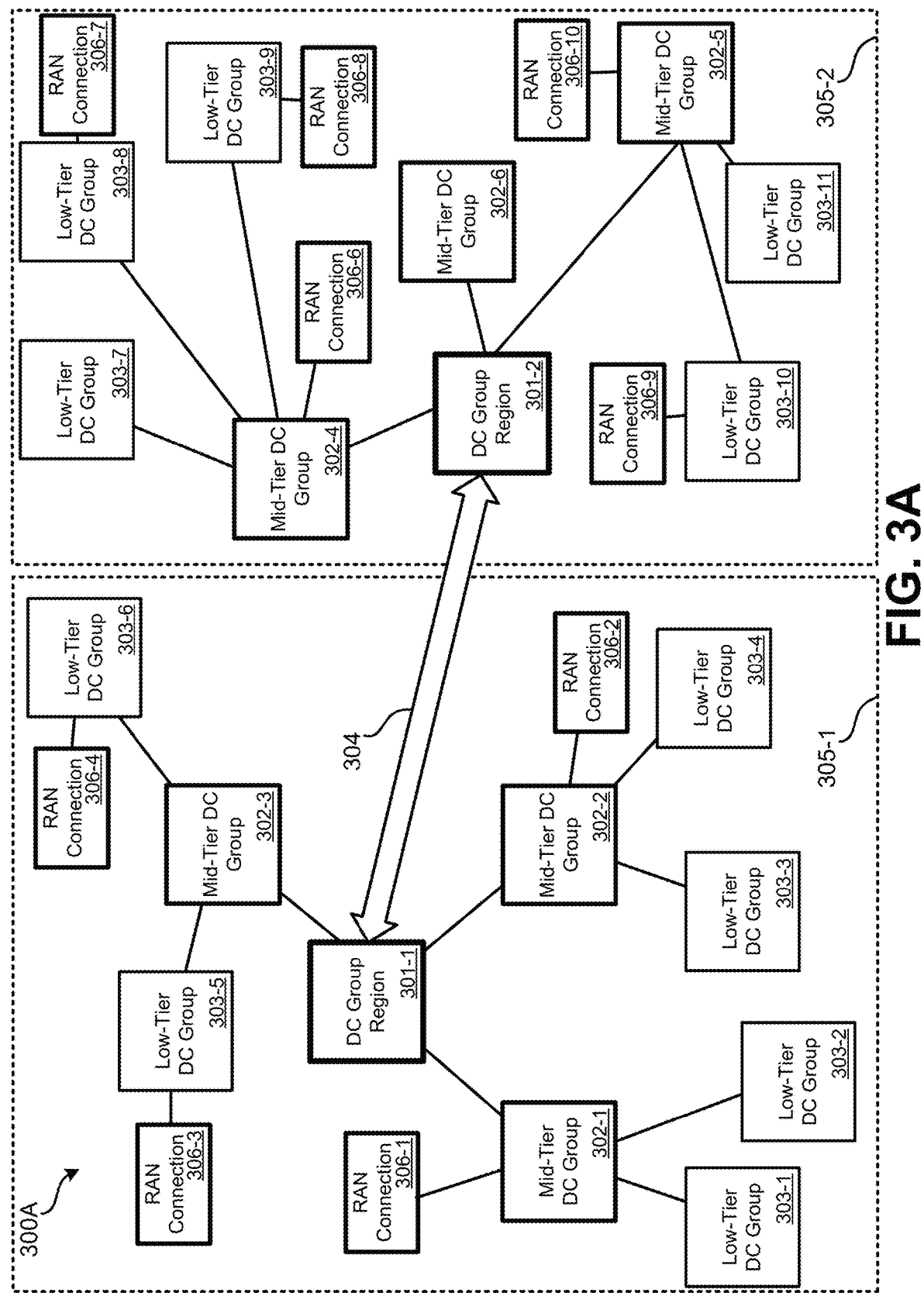
FIG. 3A illustrates an embodiment of the architecture for a cloud computing system interconnected with a cellular network radio access network (RAN).

FIG. 3A illustrates an embodiment of the architecture 300A for a PCCP interconnected with a hybrid cloud cellular network RAN. Architecture 300A can include: DC group regions 301 (301-1, 301-2); mid-tier DC groups 302 (302-1, 302-2, 302-3, 302-4, 302-5, 302-6); low-tier DC groups 303 (303-1, 303-2, 303-4, 303-5, 303-6, 303-7, 303-8, 303-9, 303-10, 303-11); and RAN connections 306 (306-1, 306-2, 306-3, 306-4, 306-5, 306-6, 306-7, 306-8, 306-9, 306-10). DC group regions 301 represent a top of a hierarchy of DC groups through which lower-hierarchy DC groups are controlled and managed within a particular region. A DC group region may be implemented for a large geographic region. For example, in a large country, such as the United States, only between 3 and 5 regions may be present, for each of which a DC group Region is present. In order to interact with services implemented at a mid- or low-tier DC group, an administrator of the client (e.g., the operator of the HCN) may access the corresponding DC group region. Large amounts of bandwidth may be available within a region between mid-tier DC groups of the DC group region, thus allowing multiple mid-tier DC groups within a region to communicate with very low latency. Such an arrangement can allow for services implemented at different mid-tier DC groups to service as backup or failover for each other. At a high level, DC group regions may define groups of tiered DCs that are interconnected with each other.

In the illustrated example of FIG. 3A, two regions are illustrated: region 305-1 and region 305-2. In region 305-1, DC group region 301-1 is present. DC group region 301-1 includes mid-tier DC group 302-1, mid-tier DC group 302-2, and mid-tier DC group 302-3. A mid-tier DC group can be referred to as an availability zone. Mid-tier DC groups may have large amounts of bandwidth with other mid-tier DC groups within the same region and DC group region 301-1 itself if it has a distinct set of computing resources. Each mid-tier DC group can be a single DC or a group of DC groups within a geographic area. If multiple DC groups are used as a mid-tier DC group, the PCCP may perform load balancing and redundancy within the mid-tier DC group. A particular DC can only be part of a single mid-tier DC group. Mid-tier DC groups, whether they include a single DC or multiple DC groups, can be geographically separated from other mid-tier DC groups and, if present, computing resources of its DC group region. Therefore, mid-tier DC groups 302 may be expected to be between 10 and 100 miles away from other mid-tier DC groups. On some PCCPs, mid-tier DC groups are the highest-tier DC groups on which a client can execute services; on such PCCPs, regions are made of clusters of mid-tier DC groups that have high bandwidth connections with each other.

Various low-tier DC groups 303 are present in regions 305. A low-tier DC group can be referred to as a local zone. A low-tier DC group can include one or more data centers. Such DCs may be relatively smaller in size than mid-tier DCs, may have their own internet connections, and may be able to provide their geographic region with low latency services. For example, in a metropolitan area that does not have a mid-tier DC group, a low-tier DC group may be present to provide low latency service. A low-tier DC group may communicate directly with one or more mid-tier DC groups with the same region. DCs of a low-tier DC group are geographically separated from DCs of mid-tier DC groups and higher level DCs, if any are present. As illustrated in FIG. 3A, low-tier DC group 303-5 is connected with mid-tier DC group 302-3. For example, low-tier DC group 303-5 may provide low latency service to Boston and is connected with mid-tier DC group 302-3, located in Virginia, via a high bandwidth connection.

RAN connections 306 represent where a component of the RAN of system 100 connects with the PCCP. For example, in region 305-1, RAN connections may exist to low-tier DC groups 303 and mid-tier DC groups 302, as shown by RAN connections 306. Such connections can represent places where a network with which the RAN is connected connects with the PCCP. For example, a private fiber network may be connected to each BS of the HCN. This private fiber network may then connect with the PCCP at various RAN connections 306.

For an HCN, communication among regions is necessary. For example, when a UE connected with the HCN moves from region 305-1 to region 305-2, the HCN must still continue to function seamlessly. Therefore, the ability to transfer data between regions 305 is needed. The PCCP may manage data transfers among regions differently than within a region. Therefore, HA and GR may be typically performed within a single region, but other data necessary for functionality of the HCN can be shared across regions 305 as needed. As illustrated, HCN data 304 is shared between DC group regions 301. In practice, this arrangement can involve mid-tier DC groups 302 transmitting data through a DC group region DC or directly among mid-tier DC groups in different regions. Further detail regarding HCN-data is provided in relation to FIG. 3B.

While two regions are illustrated in FIG. 3A, in some embodiments, an HCN can be implemented across three regions or some greater number of regions. While the PCCP may provide for a large number of regions, it may not be necessary to have core functions of the HCN implemented in every region.

Figure 3B:
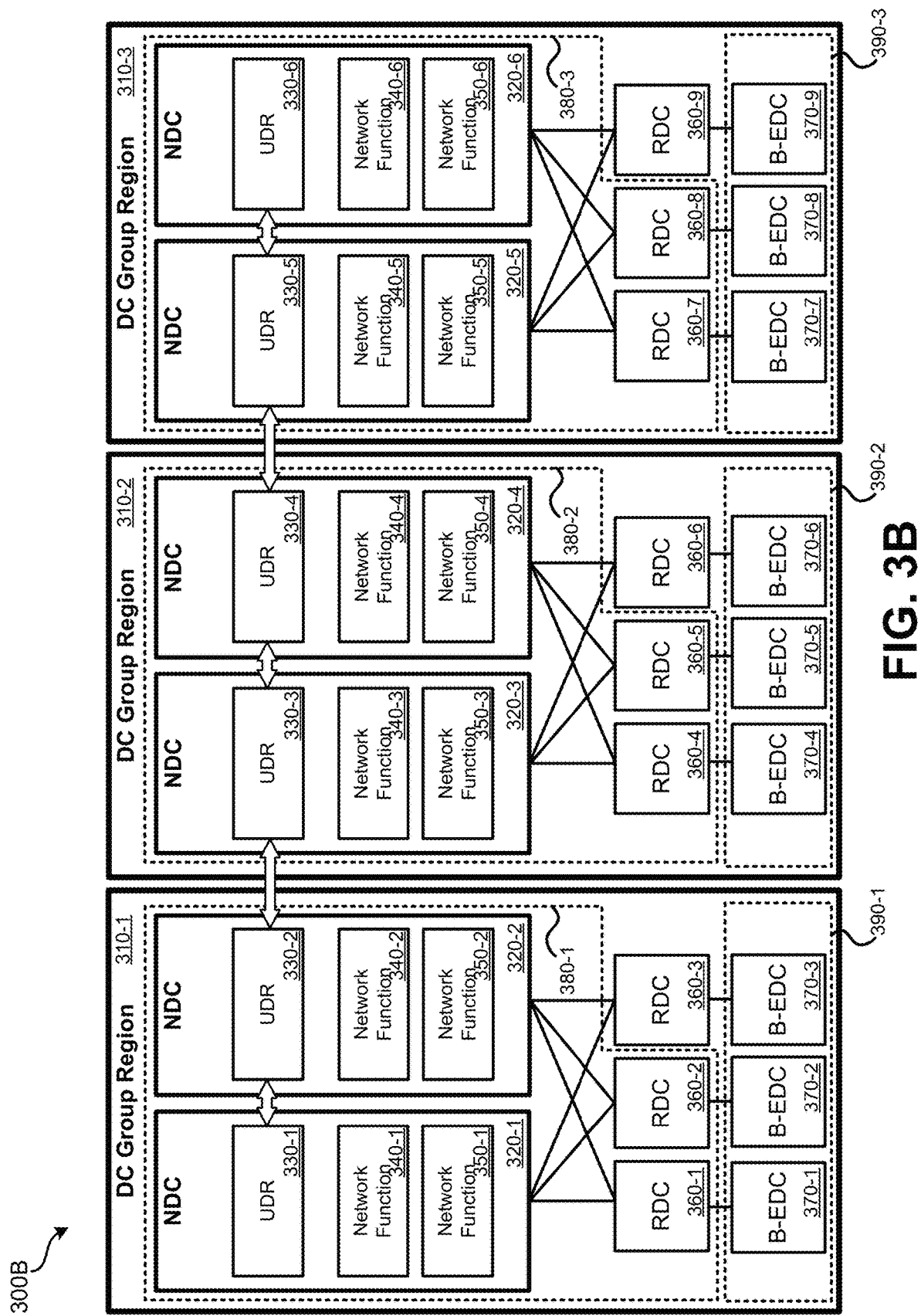
FIG. 3B illustrates an embodiment of the architecture for cloud-implemented components of a hybrid cloud cellular network.

FIG. 3B illustrates an embodiment of the architecture 300B for cloud-implemented components of a hybrid cloud cellular network. FIG. 3A illustrates the physical architecture of a PCCP; architecture 300B illustrates how NFs of an HCN are implemented on CCP architecture 300A to achieve GR and HA. Architecture 300B includes: DC group regions 310 (310-1, 310-2, 310-3); NDCs 320 (320-1, 320-2, 320-3, 320-4, 320-5, 320-6); RDCs 360 (360-1, 360-2, 360-3, 360-4, 360-5, 360-6, 360-7, 360-8, 360-9); and breakout EDCs 370 (370-1, 370-2, 370-3, 370-4, 370-5, 370-6, 370-7, 370-8, 370-9), which can be abbreviated as B-EDCs 370. DC group regions 310 can each correspond to different regions, such as regions 305-1 and 305-2. Within each DC group region, two NDCs are implemented. In a telecommunications network, an NDC may be part of the cellular network core that performs high level functions. Each NDC within a DC group region is implemented at a different mid-tier DC group. For example, within region 305-1, mid-tier DC group 302-1 may host a first NDC and mid-tier DC group 302-2 may host a second NDC. While more than two mid-tier DC groups may be present within a DC group region, the HCN may only use two of these mid-tier DC groups to host active NDCs. In some embodiments, a third NDC that is kept in standby in case of the need for failover is hosted at a third mid-tier DC group within the region. In other embodiments, each mid-tier DC group can host an NDC of NDCs 320. (Logically, NDCs within a particular DC group region can function together as a single NDC.)

Within each NDC, the same NFs may be instantiated. As illustrated, NFs 340 (340-1, 340-2, 340-3, 340-5, 340-6) and NFs 350 (350-1, 350-2, 350-3, 350-5, 350-6) are present in each of NDCs 320. In reality, many more NFs may be implemented in each NDC. Examples of NFs that can be implemented as NFs in NDCs 320 include: NRF, NSSF, Network Exposure Function (NEF), Security Edge Protection Proxy (SEPP), Binding Support Function (BSF), PCF, CHF, Service Communication Proxy (SCP), Short Message Service Function (SMSF), etc.

Load balancing and failover may be performed between instantiations of the same NF in different NDCs. This failover may remain within the same region. For example, if NF 340-1 fails, NF 340-2 may receive the traffic of NF 340-1 to prevent an outage. Additionally or alternatively, if a third inactive NDC is present within DC group region 310-1, the inactive NDC may be partially (e.g., only the failed NF) or wholly activated to allow for failover or load balancing from NF 340-1. In some embodiments, load balancing and failover are permitted across DC group regions 310 between NDCs.

Within each NDC may be a cellular network database function. This database function allows for data to be synchronized across the entirety of the HCN regardless of region. For a 5G core HCN, this database function is unified data repository (UDR) 330. UDR 330 allows for unified storage of data across NFs for the cellular network core. For example, UDRs 330 (330-1, 330-2, 330-3, 330-4, 330-5, 330-6) can be used to store service authorization data, policy data, session binding data, subscription data, and application state information. Any NF in NDCs 320 that requires storage can use UDRs 330.

While UDR 330 can be maintained as a separate repository in each of NDCs 320, each of these instances of UDRs 330 are synchronized. For example, a change made by NF 350-1 to UDR 330-1 for a particular UE is propagated to UDR 330-2, UDR 330-3, UDR 330-4, UDR 330-5, and UDR 330-6. If additional standby NDCs are present within DC group regions 310, the UDRs of those NDCs can also be kept synchronized to allow for seamless failover. In some embodiments, more than one repository is kept synchronized across NDCs 320 across multiple DC group regions 310.

Within each DC group region of DC group regions 310 may be multiple RDCs. Each RDC may be implemented at the mid-tier DC group at which a corresponding NDC is implemented. Therefore, a mid-tier DC group can host both an NDC and multiple RDCs, as shown by mid-tier function groups 380 (380-1, 380-2, 380-3). As shown in FIG. 3A, RAN connection 306-8 is connected directly with mid-tier DC group 302-4. Logically, the data from the RAN is processed through an RDC and passed to the NDC at mid-tier DC. As previously stated, NDCs 320 may only be implemented at some of the mid-tier DC groups available within a DC group region. A mid-tier DC group can host an RDC without hosting an NDC. For example, RDC 360-3 may be hosted by a mid-level DC group that does not host an NDC (or at least not an active instance of an NDC under normal operating conditions). In other embodiments, each mid-level DC group may host an NDC and an associated RDC.

Each RDC may host a same set of NFs. NFs hosted on an RDC of RDCs 360 can include: AMF, SMF, and packet gateway (e.g., PGW-C, PGW-U). Each RDC of RDCs 360 may be able to communicate with each NDC within its DC group region. In some embodiments, flexibility is present for an RDC to communicate with an NDC of a different DC group region, such as for load balancing or failover purposes.

Additionally, another layer can be present within the cellular network core below RDCs 360. B-EDCs may reside on the CCP within DC group regions 310 on low-tier DC groups 303, as indicated by low-tier function groups 390 (390-1, 390-2, 390-3). A B-EDC of B-EDC 370 may be used in a location where the CCP does not have a mid-tier DC group. For example, a minor metropolitan area may not be large enough for just the operator of the CCP installing a mid-tier DC group nearby. Therefore, in order to meet latency and/or bandwidth requirements, the CCP may implement a low-tier DC group, on which the HCN can create a B-EDC.

Each B-EDC of B-EDCs 370 may host a same set of NFs. NFs hosted on a B-EDC of B-EDCs 370 can include NFs such as a PGW-U and UPF. Each B-EDC of B- EDCs 370 may be able to communicate with each RDC within its DC group region. A primary connection may exist between an B-EDC and its immediate parent RDC, such as from B-EDC 370-1 to RDC 360-1. The secondary connections with RDC 360-2 and RDC 360-3 can be used for load balancing and failover.

Figure 4:
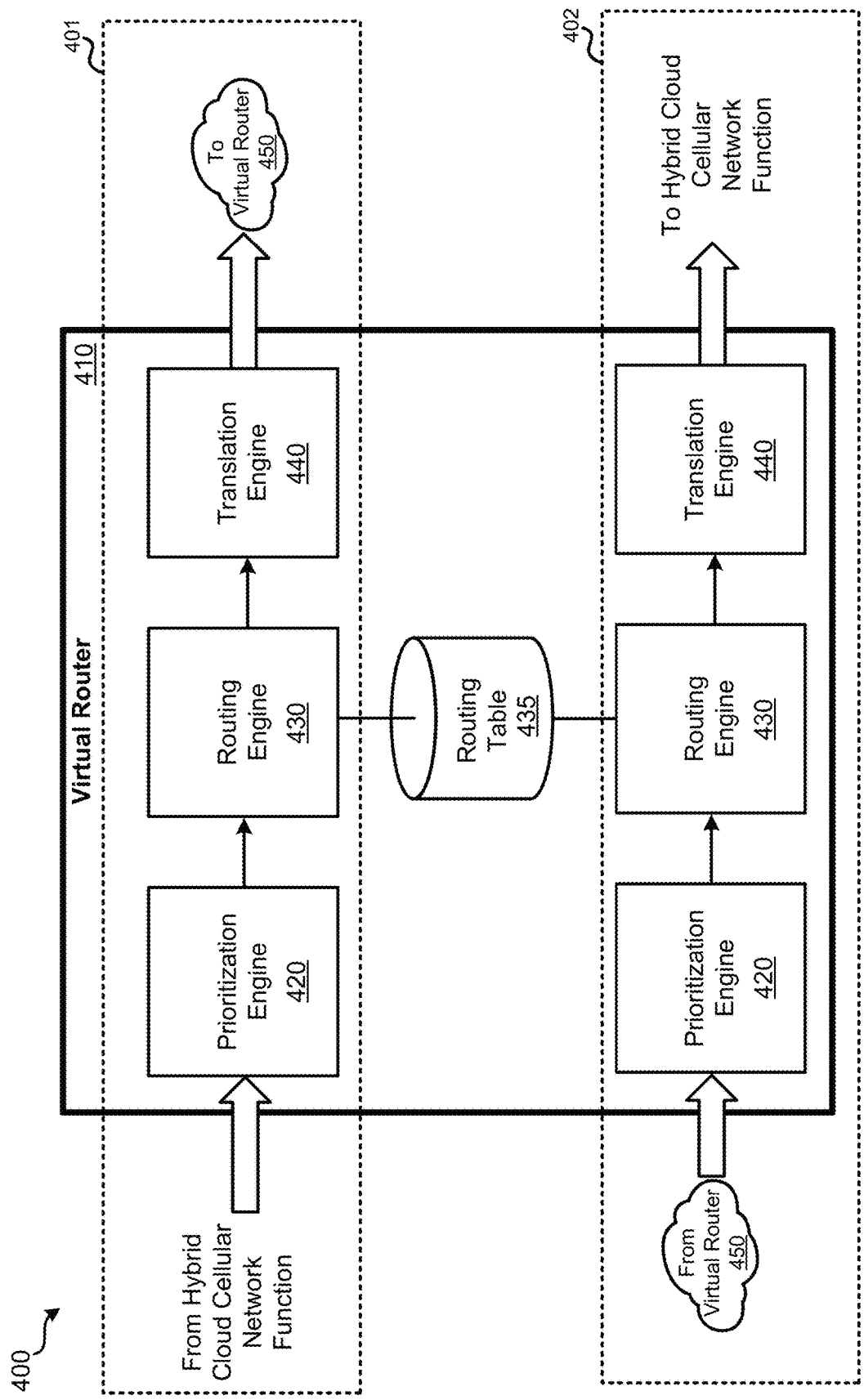
FIG. 4 illustrates an embodiment of a virtual router that can be implemented on a public cloud computing platform.

FIG. 4 illustrates an embodiment 400 of a virtual router for use as part of a hybrid cloud cellular overlay network. In embodiment 400, virtual router 410 can be mapped to a particular network function or group of network functions within a VPC. Data output from this network function is routed to another destination via virtual router 410. Data address to this network function is received by virtual router 410 and provided to the network function. Virtual router 410 can include: prioritization engines 420; routing engines 430; routing table 435; and translation engines 440.

Virtual router 410 is implemented as a software component that is executed on the public cloud computing platform within a VPC of the hybrid cellular network. Based on restrictions set on the cloud computing platform, a maximum amount of bandwidth may be used by an individual software component, such as 4 GB/s. In situations where this amount of bandwidth is insufficient, multiple instances of virtual routers may be implemented and may be mapped to a same network function (or group of network functions in a VPC), thus increasing the total available bandwidth, such as to 10 GB/s for two virtual routers. Therefore, if one of the virtual routers reaches its maximum bandwidth, another virtual router may be used for failover of additional traffic.

Prioritization engine 420 may serve to prioritize particular data being transmitted or received over other data. If virtual router 410 has sufficient bandwidth and resources available that all data being received or transmitted can be handled, no prioritization may need to be performed and data may be processed in the order in which it was received. However, if virtual router 410 reaches its bandwidth limit, data that is tagged with a greater priority is prioritized over data that does not have such a tag. For example, if virtual router 410 is operating at its maximum permitted bandwidth and prioritization engine 420 identifies data with the higher priority, the higher priority data is prioritized for transmission over the data with the lesser priority. The data with the lesser priority may be rejected or, if multiple virtual routers are mapped to the network function, the data with the less priority may be passed to the second virtual router for routing.

Such a second virtual router may also prioritize any data it receives for routing that is labeled with the greater priority. Again here, this prioritization may not matter if the second virtual router is operating below its maximum bandwidth and all data may be routed in the order received. However, if it is operating at its maximum bandwidth, the data with the higher priority is routed first, with other data with the lower priority either being cached and delayed, rejected for routing, or provided to yet another virtual router for routing.

After analysis for priority, routing engine 430 may use routing table 435 to determine to where received data is to be routed and the path along which it should be routed (e.g., via other virtual routers and possibly physical routers). Routing table 435 may be maintained via a master account of the hybrid cloud cellular network on the public cloud computing platform. The master routing tables may be propagated to the appropriate instances of components instantiated on the public cloud computing system for the hybrid cellular network. Virtual router 410 may use multiprotocol label switching (MPLS) to perform routing. Therefore, virtual router 410 allows for data packets to be forwarded at level 2 of the open systems interconnection (OSI) model. Rather than analyzing a destination IP address of a packet, MPLS allows for a first router that receives a data packet (which might be virtual router 410) to define the entirety of a path to a destination and indicate the path in a label stored as part of the packet header. (The same label may be used for indicating which packets are to be prioritized.) Translation engine 440 may properly formulate the MPLS label, which can include the indication of the label-switched path and the priority.

If multiple hops are needed for delivery of data, the label at the "ingress" router, which may be virtual router 410, can add a label that defines a path to a destination router mapped to a network function or component of the RAN. The path can be a series of virtual and/or physical routers that are communicatively connected with each other in series. One or more routers, which may be virtual routers, that are located along the path route the data packet according to the path defined in the label. A destination router, which can be referred to as an "egress" router (which also may be a virtual router) can receive the data packet and remove the label before the data packet is delivered to the destination network function or RAN component.

Box 401 illustrates how virtual router receives data from a mapped network function or group of network functions within a VPC and routes the data to another virtual router 450. Box 402 illustrates the opposite scenario: data is received from another virtual router (e.g., virtual router 450), then prioritization engine 420 analyzes the priority of the received data packet such that the data packet is processed based on its priority as previously detailed. Routing engine 430 may analyze the label of the MPLS header to determine if the data packet is to be routed to another virtual router or if virtual router 410 is the data packets egress router. If the data packet is to be routed on to another router, translation engine 440 may not modify the packet. If virtual router 410 is the egress router, translation engine 440 can remove the MPLS header and provide the data packet to the mapped network function or group of network functions within the VPC in which virtual router 410 resides.

If a virtual router hit its maximum bandwidth, for received packets that cannot be processed, a return message may be sent to the source (e.g., the previous router in the path) an indication that it cannot accept a packet. This previous router, in response to receiving the return message indicating that the virtual router was unavailable, can reroute data to another destination (e.g., another destination network function that performs the same function as the initially intended network function.

Figure 5:
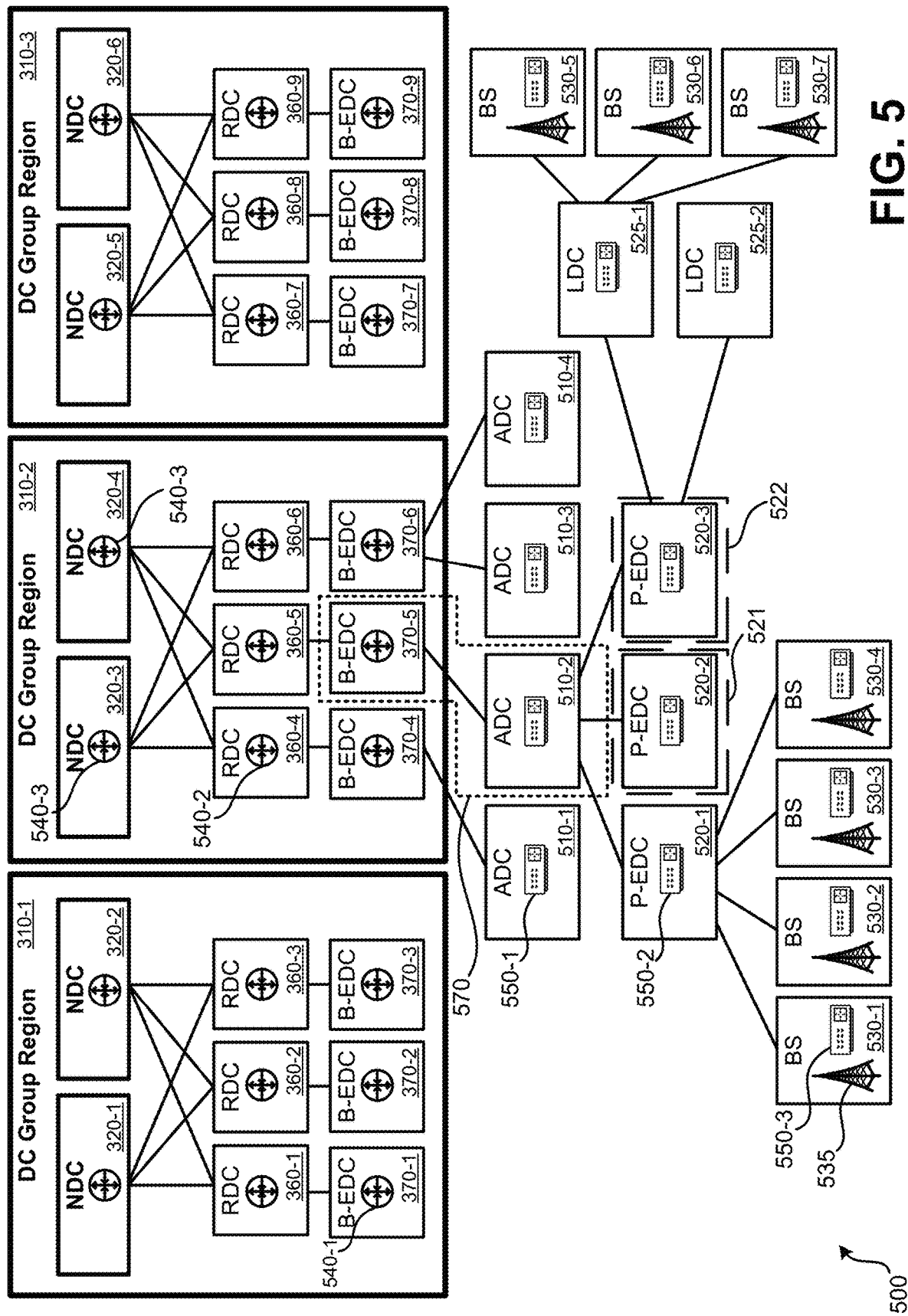
FIG. 5 illustrates an embodiment of a hybrid cellular network architecture that integrates virtual and physical routers.

FIG. 5 illustrates an embodiment of a hybrid cellular network architecture 500 that integrates virtual and physical routers. While FIG. 3B illustrates the logical architecture of the hybrid cellular network on the CCP, FIG. 5 illustrates how the RAN of the hybrid cellular network communicates with the CCP. Architecture 500 includes DC group regions 310; NDCs 320; RDCs 360; B-EDCs 370; Aggregation Data Centers (ADCs) 510; pass-through edge data centers (P-EDCs) 520; and base stations 530. Each base station may include: structure 535; one or more antennas; a physical router (e.g., router 550-3); one or more RUs; and computing hardware on which a DU is executed.

Routers 550 are physical pieces of equipment to which the RUs and DUs of a BS are connected. Routers 550 are connected with a fiber network. The fiber network may be a private fiber network on which the BS is guaranteed an amount of uplink and downlink bandwidth. Alternatively, a direct fiber connection between each BS and its P-EDC may be present.

As illustrated, multiple BSs (530-1, 530-2, 530-3, and 530-4) that are in communication with P-EDC 520-1 are illustrated. In a real-world implementation, the number of BSs connected with a P-EDC can vary from two to hundreds. Further, only BSs that are communicatively connected with P-EDC 520-1 are illustrated for simplicity. BSs may also be in communication with P-EDC 520-2 and P-EDC 520-3. BSs 530 and P-EDCs 520 represent hardware that is operated by the cellular network operator. Therefore, a physical location is maintained by the cellular network operator for each of P-EDCs 520. Each P-EDC can serve to aggregate upstream (from BS to CCP) traffic and distribute downstream (from CCP to BS) traffic. As an example, for a given metro area, where there may be one hundred BSs, each of those BSs can be communicatively connected to a local P-EDC. The P-EDC may then have a highspeed connection (e.g., fiber connection) to an ADC. ADCs 510 can serve as the RAN connections 306 of FIG. 3A.

P-EDC 520-1 includes physical router 550-2. Physical router 550-2 is a piece of hardware that manages routing between BSs 530-1 through 530-5 and ADC 510-2. Multiple P-EDCs communicate with an ADC. ADCs also represent hardware that is operated by the cellular network operator and include a physical router, such as router 550-1. As illustrated, ADC 510-2 is show in communication with P-EDCs 520. In a real-world embodiment, ADCs 510-1, 510-3, and 510-4 are also in communication with various P-EDCs. While P-EDCs 520 may be located in general geographic proximity to its BSs; ADCs 510 are located in proximity to where connections to B-EDCs 370 of the CCP are present.

ADC 510-2 may be geographically proximate to B-EDC 370-5, as indicated by outline 570. ADC 510-2 is located in a same physical facility (e.g., DC) as B-EDC 370-5, with a high-speed connection with low latency present between ADC 510-2 and B-EDC 370-5. Alternatively, ADC 510-2 may be located in a different data center than B-EDC 370-5, but a high-speed direct fiber link between ADC 510-2 and B-EDC 370-5 can be present. Therefore, despite many BSs communicating with P-EDCs 520, only a single connection to the CCP via ADC 510-2 is needed to connect the BSs to the CCP.

Since the number of locations at which the CCP has EDCs 370 is limited, while an ADC may be placed geographically proximate to each EDC of the CCP being used, P-EDCs 520 may be geographically dispersed. As an example, if B-EDC 370-5 is located in Denver, ADC 510-2 may be located at the same facility or be in another facility located near Denver with a high-speed connection to B-EDC 370-5. P-EDC 520-1 may be located in Denver and may communicate with BSs in the metropolitan Denver area. P-EDC 520-2 may be located elsewhere, such as a hundred kilometers north to service BSs in southern Wyoming. P-EDC 520-3 may be located in Salt Lake City to service BSs near Salt Lake City. Therefore, geographic location 521 may be hundreds of kilometers from geographic location 522. In this example, Salt Lake City may not have its own EDC of the CCP, and therefore an EDC available in another region is needed to be used to interface with the CCP. Each of these P-EDCs has a high-speed connection to ADC 510-2.

For a given EDC, a single ADC may be present locally or multiple ADCs, such as when the EDC is used for a large number of P-EDCs. For example, B-EDC 370-6 is in direct communication with both ADC 510-3 and ADC 510-4. ADCs 510-3 and 510-4 are both geographically proximate to B-EDC 370-6, such as in the same DC or at least in the same metropolitan area and connected with a high-speed fiber connection.

In some embodiments, for some or all P-EDCs, an additional layer of aggregation may be present. Local Data Centers (LDCs) 525 each include one or more routers and serves to aggregate upstream traffic and distribute downstream traffic. Therefore, multiple BSs (such as BSs 530-5, 530-6, and 530-7) can be connected with LDC 525-1, which has a single high-speed connection with P-EDC 520-3. Such an arrangement can prevent some number of BSs from each needing to have a connection with P-EDC 520-3.

While physical routers are used at ADCs 510; P-EDCs 520; LDCs 525; and BSs 530 on the CCP that includes DC group regions 310, routing is performed by virtual routers 540. For simplicity, only two virtual routers 540-1 and 540-2 are explicitly labelled. A virtual router is a piece of software that is executed on the CCP that performs the functions of a physical router.

A virtual router may be instantiated on the CCP such that it receives data from RAN or CCP cellular network components (e.g., network functions). The virtual router then prioritizes and formats the data such that it is appropriate for transmission via the underlying native routing of the cloud computing platform. The underlying native routing architecture of the cloud computing platform, which includes physical routers, then performs the routing to the appropriate virtual router that is associated with another component of the hybrid cloud cellular network, which can be within the same sub-region, a different sub-region, or a different cloud-computing region altogether. The receiving virtual router reformats the received data and transmits it to the appropriate local component for which the data was addressed or labeled, or forwards to another virtual router based on the address or label. From the perspective of the cellular network operator, the virtual routers function as physical routers, such that no consideration needs to be given to the virtual router's underlying use of the cloud platform's native routing.

Virtual routers rely on the CCP's underlying native routing functionality; however, virtual routers can use multi-protocol label switching (MPLS) with generic routing encapsulation (GRE) to overcome limitations of the cloud service's native routing. By using MPLS, rather than relying on addressing, a labeling system can be used to direct traffic. For example, data received by virtual router 540-2 may be labeled as intended for NDC 320-3. Based on this label, virtual router 540-2 may route the data to virtual router 540-3.

Each virtual router can have some number, such as eight, GRE tunnels, per routing destination, which can be used to overcome a flow limit present on the CCP. A virtual router can perform routing based on a stored routing table and can serve to route received data based upon characteristics of the received data (e.g., an indicated destination, such as a destination address, an indication of where the data originated, a priority indicated in the received data, a type of the received data). Since the virtual routers can use GRE tunnels, limitations of the underlying cloud computing platform routing architecture regarding prioritization, routing protocols, and IP addresses being reused in different DC group regions 310 can be worked around.

Further, virtual routers can perform forwarding to other virtual routers if a direct route is not available. If a GRE tunnel does not exist directly for a particular route, one or more intermediary virtual routers can be used for forwarding. A given layer in a sub-zone may have more than one virtual router. For example, each RDC of RDCs 360 may have multiple virtual routers. Having multiple virtual routers can help if large volumes of data need to be transmitted, such as to a lower layer in the cellular network hierarchy, not illustrated here.

It may not be necessary to establish GRE tunnels between each and every virtual router pair. For example, in a cellular network, the network functions as a hierarchy. Therefore, higher level NFs tend to communicate with lower-level NFs arranged in the hierarchy. As an example of this arrangement, virtual router 540-3 may need to have a GRE tunnel with virtual router 540-2 of RDC 360-4, but not directly with virtual router 540-4 of NDC 320-4 due to no or limited traffic occurring between these virtual routers on the CCP.

From the perspective of physical routers 550, virtual routers are indistinguishable from physical routers. Similarly, virtual routers 540 can route data to physical routers 550 as they would to other virtual routers. All necessary processing and/or conversion needed to allow virtual and physical routers to interact is performed using the arrangement detailed in relation to FIG. 6.

Figure 6:
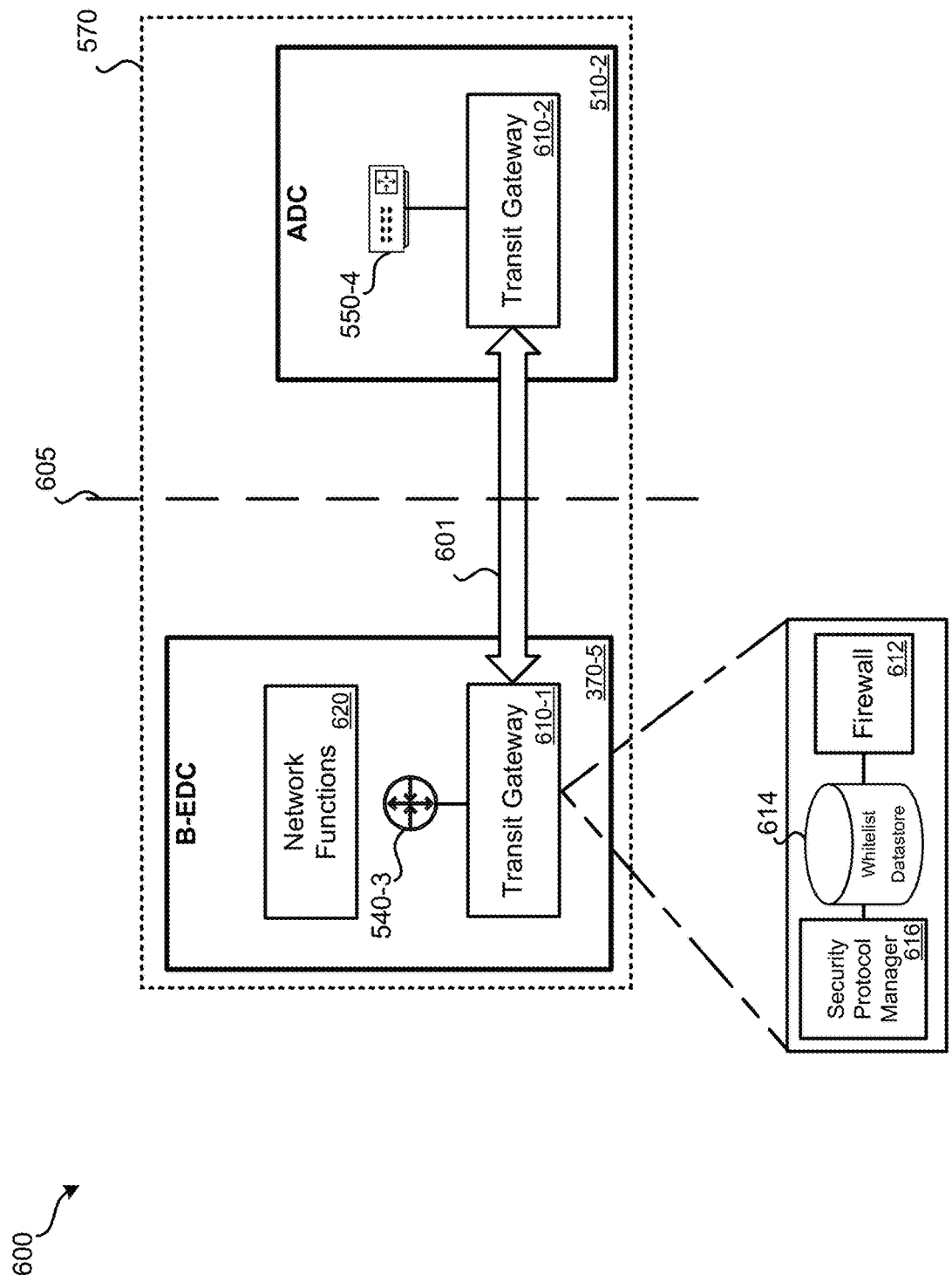
FIG. 6 illustrates an embodiment of transit gateways incorporated as part of a hybrid cellular network architecture.

In order to maintain security and allow for interfacing between virtual and physical routers of the hybrid cellular network, transit gateways are used on both sides of the connections between the RAN and the CCP. FIG. 6 illustrates an embodiment of transit gateways incorporated as part of a hybrid cellular network architecture 600. In architecture 600, details of communication between B-EDC 370-5 and ADC 510-2 are shown. This pair of an ADC and EDC is exemplary: a similar or the same architecture can be present between other EDCs of the CCP and ADCs of the hybrid cellular network's RAN.

Architecture 600 can include: B-EDC 370-5; NFs 620; virtual router 440-3; transit gateway 610-1; high-speed direction connection 601; ADC 510-2; physical router 450-4; and transit gateway 610-2. As shown in FIG. 4, B-EDC 370-5 and ADC 510-2 may be physically proximate, as indicated by outline 470, such as in the same DC. Line 605 indicates the transition from the RAN of the hybrid cellular network to services executed on the CCP at the EDC on behalf of the cellular network operator.

B-EDC 370-5 and ADC 510-2 may each have a transit gateway 610. A transit gateway allows for on-premise networks (e.g., ADC 410-2) to be connected with a virtual private cloud (VPC) on the PCCP of the hybrid cellular network. A transit gateway can enforce a firewall and manage security protocols. Each transit gateway may include several subcomponents. Such subcomponents of transit gateway 610-1 are illustrated: firewall 612; whitelist datastore 614; and security protocol manager 616.

Whitelist datastore 614 includes the identities of devices with which transit gateway 610-1 is permitted to allow communication traffic through. For example, ADC 510-2 must be included in whitelist datastore 614 in order for its traffic to be permitted onto B-EDC 370-5 by transit gateway 610-1. Firewall 612 blocks traffic of any external device that does not have its identity included on whitelist datastore 614. A similar whitelist is maintained at transit gateway 610-2 such that an identity of B-EDC 370-5 (or transit gateway 610-1) is required to be maintained in the whitelist datastore of transit gateway 610-2 in order to prevent the firewall of transit gateway 610-2 from blocking received data from transit gateway 610-1.

Each transit gateway can include security protocol manager 616. Security protocol manager 616 can serve to manage security-related transactions between virtual and physical routers, such as exchanges of security keys. For example, security protocol manager 616 can serve to ensure that data received from a physical router is encrypted using a proper encryption key.

All traffic between ADC 510-2 and B-EDC 370-5 can occur via transit gateways 610. As an example, upstream data from a BS bound for NDC 320-3 may be received by physical router 550-4. Router 550-4 can route the received data through transit gateways 610 to virtual router 540-3. Virtual router 540-3 may analyze the received data, and relay the upstream data to the virtual router of RDC 360-5 (as seen in FIG. 5). The virtual router of RDC 360-5, based on its routing table, may analyze the received data, and relay the upstream data to virtual router 540-3 of NDC 320-3. Upon receipt, based on its routing table, virtual router 540-3 can determine that the upstream data is to be processed locally at NDC 320-3 and the upstream data can be routed to the appropriate NF executed at NDC 320-3.

NFs 620 represent that some network functions of the hybrid cellular network can be implemented directly at an EDC. For example, a user plane function for data (UPF-D) can serve as the gateway to the Internet for UE. Such an arrangement can allow for a low-latency connection for UE to the Internet by not requiring Internet traffic to be routed through the RDC or NDC of the cellular network core.

Figure 7:
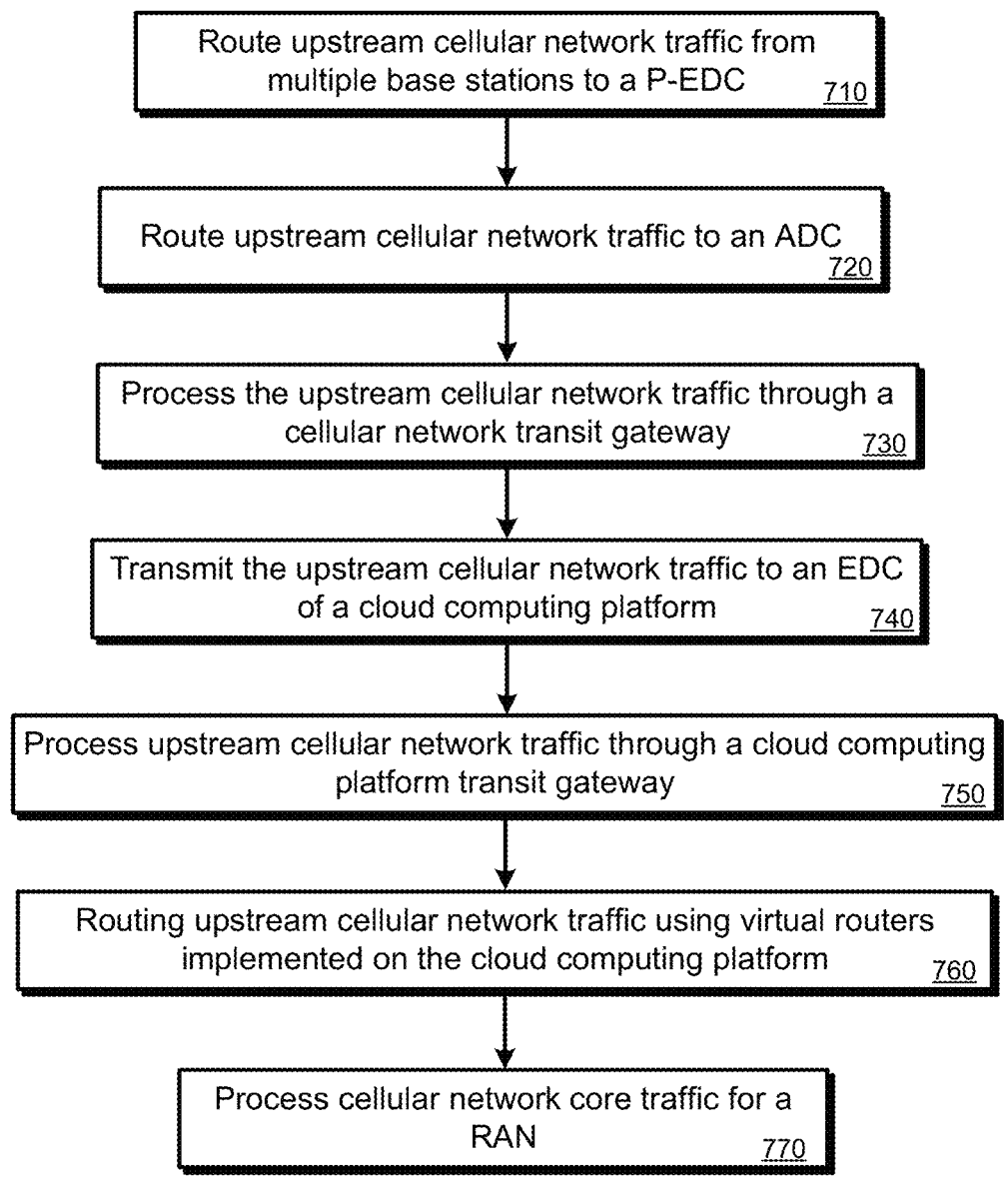
FIG. 7 illustrates an embodiment of a method for using a hybrid cellular network architecture that integrates virtual and physical routers via transit gateways.

Various methods can be performed using the systems and architectures of FIGS. 1-5. FIG. 7 illustrates an embodiment of a method 700 for using a hybrid cellular network architecture that integrates physical routers of a RAN with cloud-implemented cellular network core via transit gateways. Embodiments of method 700 can be performed using hybrid cellular network architectures detailed herein.

At block 710, upstream cellular network traffic (e.g., voice and/or data traffic) is routed from multiple BSs to a P-EDC operated as part of the RAN by the cellular network operator. In some embodiments, prior to receipt by the P-EDC, upstream cellular network traffic from multiple BSs may be routed through an LDC. This arrangement allows for a single P-EDC to receive data from many BSs. One or more P-EDCs can route the upstream data to a designated ADC of the cellular network at block 720. A high-speed connection can be present from a P-EDC to a particular ADC of the RAN of the cellular network.

At block 730, the upstream traffic received by the ADC via the ADCs one or more physical routers, is transmitted via a transit gateway to an EDC of the cloud computing platform. The transit gateway may analyze the received upstream traffic to confirm that the traffic is received from a whitelisted source. At block 740, the upstream cellular network traffic is transmitted locally (e.g., via a direct fiber optic connection) to the EDC of the CCP.

At block 750, the upstream cellular network traffic is processed by a transit gateway executed on the EDC of the CCP. The transit gateway confirms that the upstream cellular network traffic was received from a whitelisted source (e.g., the ADC) and can perform any protocol conversion necessary to allow the data routed by the physical routers of the RAN (e.g., at BSs, P-EDCs, ADCs) to be routed to the appropriate virtual router on the CCP.

At block 760, the upstream cellular network traffic is routed using a virtual router executed at the EDC to route the data to its appropriate destination, such as to an RDC or NDC executed on the CCP within the DC group region. At block 770, the upstream cellular network traffic is processed using the appropriate network functions at the component to which the upstream cellular network traffic was addressed. For instance, some of the upstream cellular network traffic may be processed at an RDC, while other data is labeled such that it would be routed to the NDC.

While method 700 is focused on upstream cellular network traffic, method 700 can be performed in reverse such that downstream traffic is routed from NFs of the NDC or RDC of a DC group region to the appropriate BS for which the data is addressed or labeled.

Figure 8:
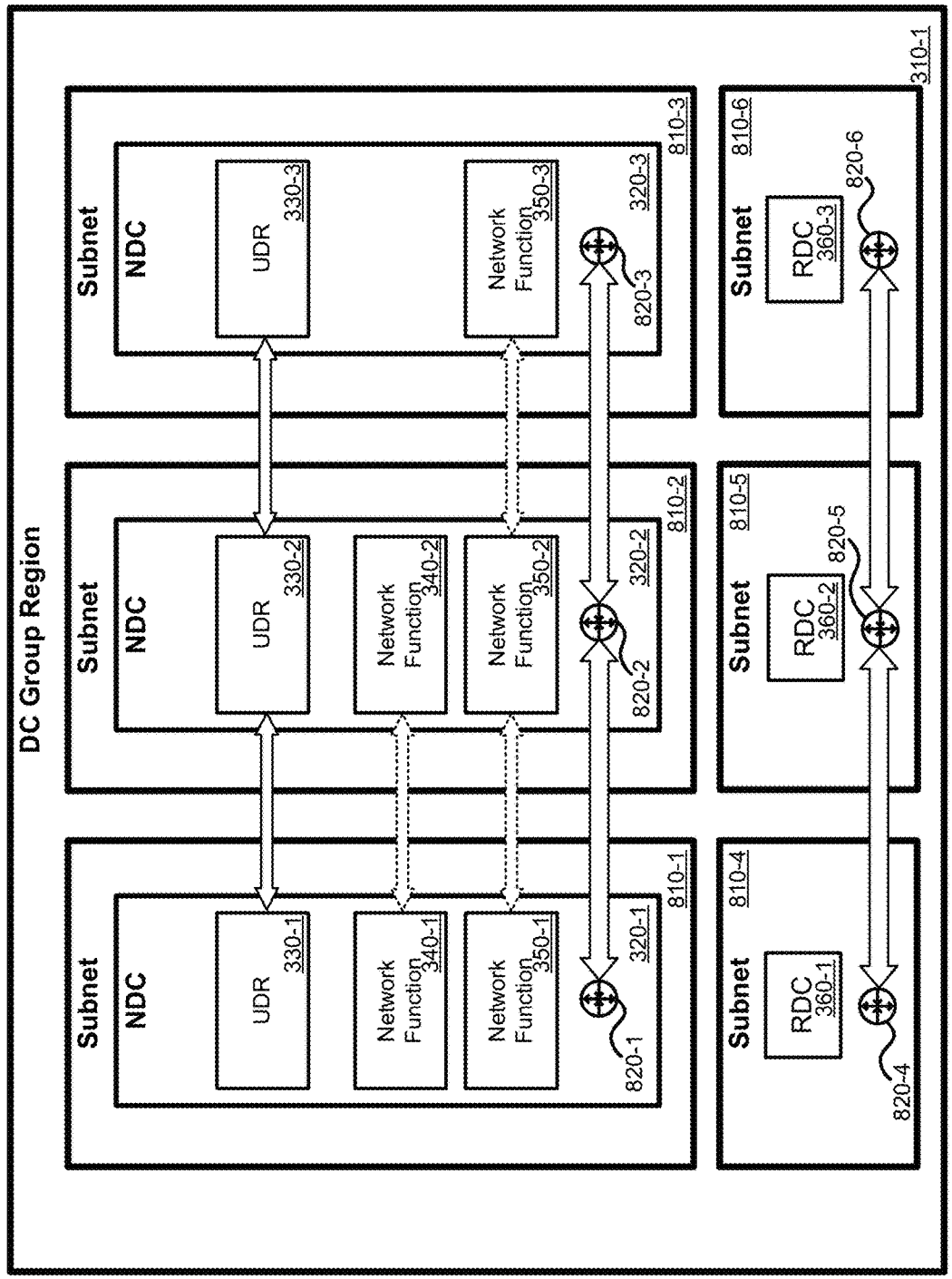
FIG. 8 illustrates an embodiment of the architecture of the hybrid cellular network within a region on a public cloud computing platform.

FIG. 8 illustrates an embodiment of the architecture 800 of the hybrid cellular network within a region on a public cloud computing platform. Within a DC group region, such as DC group region 310-1, multiple subnets may be defined on the PCCP by the hybrid cellular network operator.

A subnet is a range of IP addresses that is mapped to a particular set of functions executed within the subnet. The subnet is defined such that all of its functions are executed at a particular data center or group of data centers. For instance, referring to FIG. 3A, a defined subnet may be created at mid-tier DC group 302-1. Therefore, all NFs of the HCN executed within the subnet are executed at mid-tier DC group 302-1. By defining multiple subnets at different DC groups, the HCN operator can ensure that each set of NFs is executed at different DC groups.

A subnet may be defined as either a public subnet or a private subnet. A public subnet allows traffic to be routed to the Internet via a gateway, while a private subnet requires the use of a network address translation device or component. Within a virtual private cloud (VPC) of the hybrid cellular network provider on the PCCP, there may be a public and private subnet.

A VPC is an isolated virtual network on a PCCP mapped to a particular client. For a hybrid cellular network, each VPC may be mapped to a parent account of the hybrid cellular network provider. One or more child accounts may be mapped to a VPC to allow particular entities, such as particular employees or vendors, to access a particular VPC of the HCN, to the exclusion of other VPCs. As an example, referring to FIG. 3B, a first VPC may include NDC 320-1. A second VPC may include NDC 320-2. Each of RDCs 360 can be part of a separate VPC.

Within DC group region 310-1, some number of subnets 810 may be established, such as three, for NDCs 320. Each subnet may be defined such that the corresponding NDC is executed at a different DC or DC group. For example, on AWS, each subnet may be mapped to a different availability zone. Referring to FIG. 3A, each subnet may be instantiated at a different mid-tier DC group within a region.

Within each subnet, which are each mapped to particular IP address ranges, the same network functions may be executed. Referring to NDC 320-1 and NDC 320-2, the same NFs are executed. Since the data at UDRs 330 are kept synchronized, it may not matter whether network function 340-1 or network function 340-2 processes data (e.g., a packet) received from an RDC of RDCs 360. Therefore, for example, if NF 340-1 is overloaded, particular packets that were to be delivered to NF 340-1 can instead be delivered to NF 340-2 (which is an instance of the same NF) for processing instead.

In some embodiments, in a given region of the PCCP, two subnets may be actively used while a third subnet is reserved as a backup. Accordingly, not all NFs may be replicated across all subnets 810 within DC group region 310-1. In the example of FIG. 3B, two NDCs are shown in each DC group region. While two NDCs may actively function, FIG. 8 shows that a third NDC 320-3 may be present that can function as a backup, such as for failover and load balancing. (While shown as separate NDCs, within a region, each of NDCs 320 can be logically understood to function in concert as a single NDC.)

NDC 320-3 may only have some NFs instantiated. For example, NF 350-3 can represent an NRF, NSSF, NEF, CHF, or PCF. Other NFs may not be instantiated as part of NDC 320-3, such as a UDM, AUSF, or media resource function (MRF). If needed for failover or load-balancing, such NFs could be instantiated at NDC 320-3 within subnet 810-3.

As shown by dotted arrows in FIG. 8, NFs 340, while instantiated as part of different subnets, function in concert to perform their function. As needed for load-balancing and failover, a packet to be processed by NF 340-1 can instead be routed for processing to NF 340-2. If needed, such as due to a failure of NF 340-2, another instantiation of the NF may be created in NDC 320-3. As another example, load-balancing and failover can occur between all three instantiations of NF 350. When operating normally, only NF 350-1 and NF 350-2 may be active. However, as needed, load balancing may occur between NFs 350-1 and 350-2. If needed for failover or load balancing, NF 350-1 could partially failover or have some traffic rerouted to NF 350-2 and partially failover or have some traffic routed to NF 350-3. Similarly, NF 350-2 could partially failover or have some traffic rerouted to NF 350-1 and partially failover or have some traffic rerouted to NF 350-3.

In order to manage failover and load balancing, virtual routers may re-route data between different subnets 810. For example, data transmitted by RDC 360-1 via virtual router 820-4 that is labeled for delivery to NF 340-1 may be rerouted by virtual router 820-1 to virtual router 820-2 for delivery to NF 340-2 based on the status of NF 340-1. The routing tables of virtual routers 820 may be altered as needed to handle instances of an NF failing or for load balancing.

RDCs 360 may reside in their own subnets 810-4 through 810-6. Subnet 810-4 may be instantiated at the same DC or group of DCs as subnet 810-1, subnet 810-5 at the same DC or group of DCs as subnet 810-1, and subnet 810-6 at the same DC or group of DCs as subnet 810-3. Alternatively, RDCs may be implemented within each of subnets 810.

Within each of subnets 810-4 through subnets 810-6 may be an RDC, which can function as detailed in relation to FIG. 3B. Each of these subnets may also have at least one virtual router. Load balancing and failover is available among RDCs 360. Virtual routers 820-4, 820-5, and 820-6 allow for routing of data between RDCs 360 and also for the routing of data between NDCs 320 and RDCs 360. For example, virtual router 820-4 can route data on the PCCP to virtual router 820-1. For failover and load balancing purposes, virtual routers 820 can be used to distribute traffic from RDCs 360 among NDCs 320. (While not illustrated, traffic can be routed between virtual routers 820-4 and 820-6 and similarly between virtual routers 820-1 and 820-3.)

If needed for failover or load balancing, RDC 360-1 could partially failover or have some traffic rerouted to RDC 360-2 and partially failover or have some traffic routed to RDC 360-3. RDC 360-2 could partially failover or have some traffic rerouted to RDC 360-1 and partially failover or have some traffic rerouted to RDC 360-3. Similarly, RDC 360-3 could partially failover or have some traffic rerouted to RDC 360-1 and partially failover or have some traffic rerouted to RDC 360-1.

Therefore, each RDC can exchange data via virtual routers with any of NDCs 320. While each of NDCs 320 is located in physically separate DCs or groups of DCs, the underlying physical networking is managed by the PCCP provider. Therefore, the HCN provider manages the virtual routers instantiated within the HCN's VPCs, but the physical routing is managed by the PCCP. Such an arrangement allows the HCN provider to perform packet-level failover and load balancing as desired among different DCs or DC groups of the PCCP, such as by altering the routing tables of the virtual routers.

Figure 9:
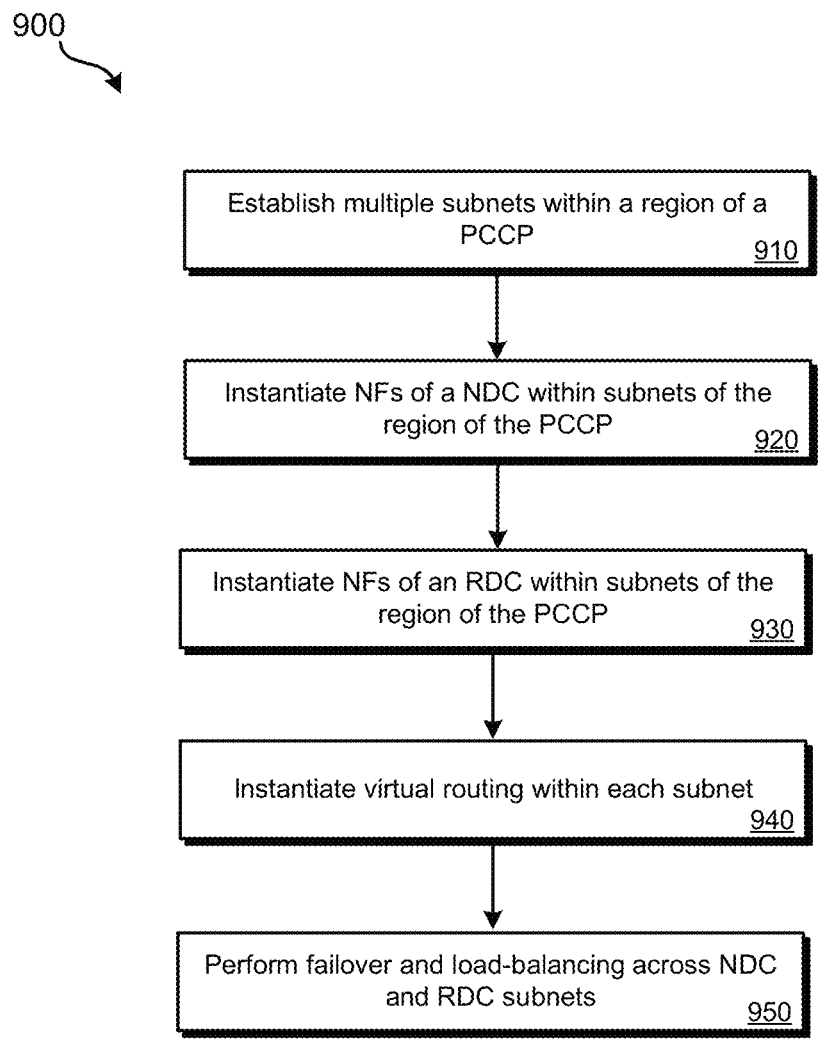
FIG. 9 illustrates an embodiment of a method for establishing high availability within a region of a cloud computing platform for a hybrid cellular network.

Such an arrangement can be used to perform various methods. FIG. 9 illustrates an embodiment of a method 900 for establishing high availability within a region of a cloud computing platform for a hybrid cellular network.

At block 910, within a region of a PCCP, multiple subnets are established. The subnets are established across multiple different data centers or different data center groups. For example, within a region of the PCCP, subnets may be established at three different DCs or DC groups, such as a mid-tier DC group 302-2.

At block 920, NFs of an NDC are instantiated within the subnets. In some embodiments, the NFs may be the same across each subnet. Collectively these subnets may function together as an NDC for the region. In some embodiments, not all NFs are instantiated in a subnet. This subnet may be used as a backup within the region in case of failover or high loads within the other subnets. The NFs instantiated across the subnets can include a UDR as detailed in relation to UDR 330 of FIG. 3B.

At block 930, within the same region, NFs of RDCs may be instantiated within separate subnets. NFs for an RDC may be instantiated in its own subnet in DCs or DC groups that match the subnets of the NDCs. For example, referring to FIG. 4, subnet 410-1 and subnet 410-4 may be present at the same DC or DC group. Alternatively, the NFs of RDCs can be implemented within the subnets instantiated for the NDCs. For example, RDC 360-1 could be implemented within subnet 410-1.

At block 940, virtual routing is instantiated within each subnet to enable routing of data between the NFs of each RDC and the NFs of each NDC. One or more services can be implemented within a subnet to allow packets of data to be transmitted between NFs. At block 950, at a packet level, failover and load balancing can be performed, such as via the virtual routers, between individual NFs of the NDCs, among the NDCs (e.g., traffic being routed to a different subnet hosting NDC NFs by NFs of an RDC), or among the RDCs (e.g., traffic being routed to a different subnet hosting RDC NFs by NFs of an NDC). For example, once a particular NF within the NDC components of a subnet hits a threshold (e.g., a defined amount of processing resources being used), traffic may be routed to an instance of the same NF residing in a different subnet (which is at a different DC or group of DCs) for processing. If that NF is also experiencing a high load, an instance of the same NF may be instantiated within the subnet functioning as a backup. Such an arrangement allows for high availability of NFs within the PCCP region.

Figure 10:
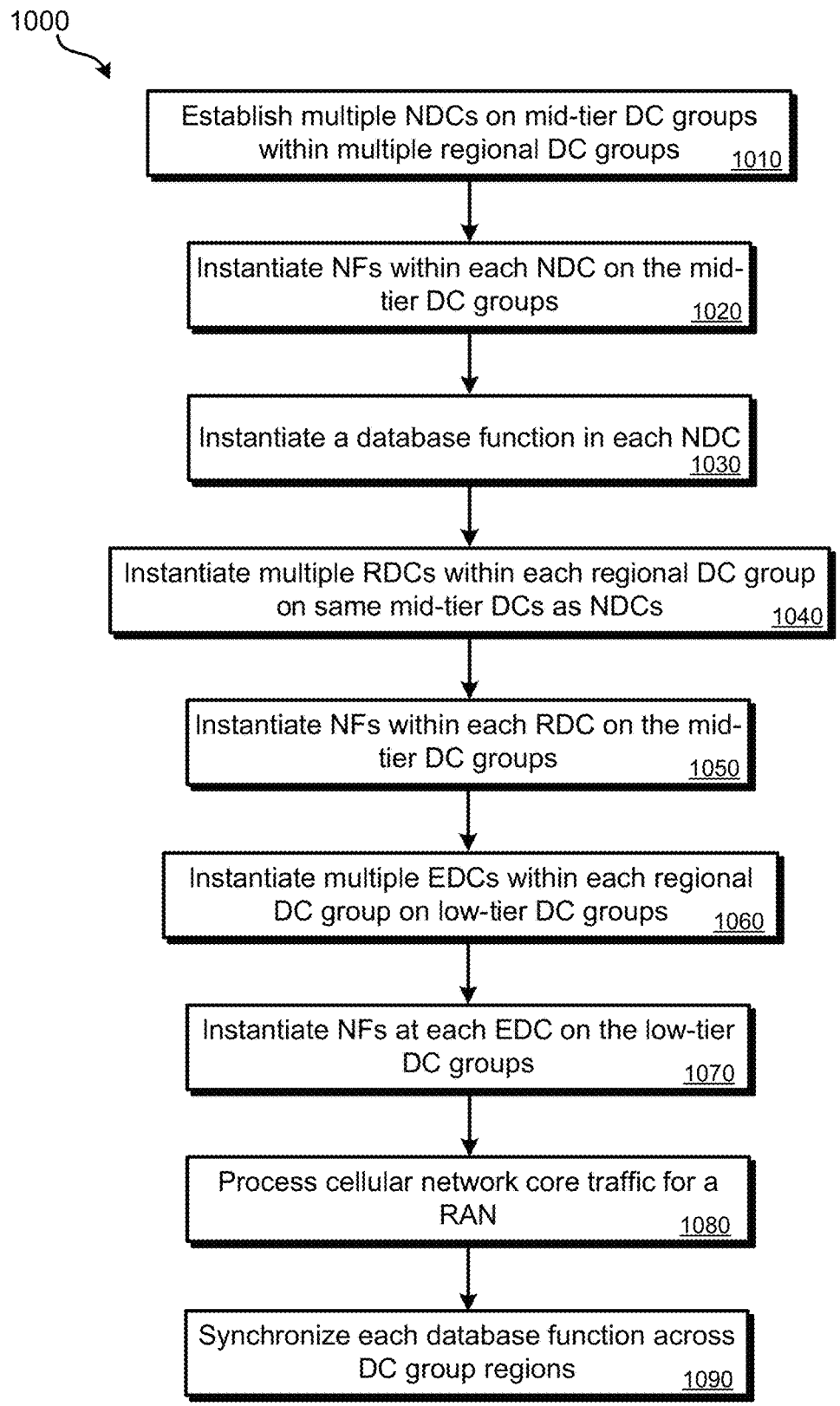
FIG. 10 illustrates an embodiment of a method for establishing geographic redundancy and high availability for a cloud-implemented cellular network core.

FIG. 10 illustrates an embodiment of a method 1000 for establishing geographic redundancy and high availability for a cloud-implemented cellular network core of a hybrid cellular network. The systems and devices of FIGS. 1-6 and 8 may be used to perform method 1000. Each block of method 1000 can be implemented by an HCN that has its core implemented on a PCCP. The hardware for the PCCP can be operated and maintained by an entity separate from the HCN and can allow many clients to reserve and use resources of the PCCP.

At block 1010, multiple NDCs can be established for an HCN within multiple regional DC groups of a PCCP. Each NDC may be instantiated with the same or similar parameters. For example, some number of clusters may be instantiated within each NDC. Each cluster can be used to execute one or more NFs. Clusters can have the same or different parameters. A cluster can be defined to reserve processing, memory, and/or bandwidth resources for NFs executed within the cluster. The NDCs of block 1010 can each be instantiated at different mid-tier DC groups (which, on some PCCPs, may be the highest-level DCs on which a client can instantiate services). At block 1020, NFs are instantiated within clusters of each NDC at the mid-tier DC groups. The NFs instantiated may be the same across each NDC; however, the number of instances of each NF in each NDC may vary based on load. (Further, as detailed in relation to FIG. 1, based on the slices and loads, an orchestrator can be permitted to instantiate and destroy NFs as needed.) In some embodiments, these multiple NDCs can be referred to logically as a single NDC.

At block 1030, a database function in each NDC may be instantiated. This database function can allow cellular network data to be shared across all NDCs. On a 5G-based cellular network core, the database function can be a UDR that can be used by some or all NFs to store data, as previously detailed. As part of block 1030, links can be established among the database functions such that the databases remain synchronized.

At block 1040, multiple RDCs can be instantiated at the same mid-tier DC groups as which the NDCs were instantiated. In some embodiments, at least one RDC is instantiated at a mid-tier DC group at which no NDC has be instantiated. In some embodiments, in three regions, two active NDCs are instantiated in each DC group region, along with three RDCs per region (for a total of nine RDCs). Of the three RDCs, one RDC is instantiated at a mid-level DC group at which no NDC is present. Each RDC may be primarily mapped to a particular NDC, but each RDC may be permitted to communicate with each NDC within the region as needed for GR and HA.

At block 1050, NFs are instantiated within clusters of each RDC at the mid-tier DC groups. The NFs instantiated may be the same across each RDC; however, the number of instances of each NF in each RDC may vary based on load. (Further, as detailed in relation to FIG. 1, based on the slices and loads, an orchestrator can be permitted to instantiate and destroy NFs as needed.)

At block 1060, for each RDC, an EDC may be instantiated on a lower-tier DC group than on which the NDCs and RDCs were instantiated. (Therefore, for example, if the NDCs and RDCs were implemented on the highest-tier DC group of a PCCP available, the EDC may be implemented on the next-lower DC tier available.) Each EDC may be primarily mapped to a particular RDC, but each EDC may be permitted to communicate with each RDC within the region as needed for GR and HA.

At block 1070, NFs are instantiated within clusters of each EDC at the low-tier DC groups. The NFs instantiated may be the same across each EDC; however, the number of instances of each NF in each EDC may vary based on load. (Further, as detailed in relation to FIG. 1, based on the slices and loads, an orchestrator can be permitted to instantiate and destroy NFs as needed.)

At block 1080, the cellular network core implemented on the PCCP may be used to process RAN traffic. The RAN may communicate with the cellular network on the PCCP using various access points between the RAN (or a network connected with the RAN) and the PCCP. At block 1090, the database function across the multiple regions is kept synchronized across each NDC in each region. Therefore, by accessing a local copy of the database function (e.g., UDR) in an NDC, the same data that is available via the database function at other NDCs in the same and other region is available.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A hybrid cloud cellular network, comprising:
   a radio access network (RAN) comprising a plurality of base stations (BSs);
   a plurality of national data center (NDC) instantiations on a cloud computing platform, wherein:
   the cloud computing platform is communicatively connected with the RAN; and
   a first set of NDC instantiations of the plurality of NDC instantiations is executed in a first data center group region of the cloud computing platform and a second set of NDC instantiations of the plurality of NDC instantiations is executed in a second data center group region of the cloud computing platform;
   a plurality of network functions (NFs), wherein an instance of each NF is executed within each NDC instantiation of the plurality of NDC instantiations;
   a cellular network database function, wherein:
   an instance of the cellular network database function is executed within each NDC instantiation of the plurality of NDC instantiations; and
   each instance of the cellular network database function updates each other instance of the cellular network database function across the plurality of NDC instantiations; and
   a plurality of regional data center (RDC) instantiations, wherein at least one RDC instantiation of the plurality of RDC instantiations is implemented at a same data center group at which an NDC instantiation of the plurality of NDC instantiations is implemented.

2. The hybrid cloud cellular network of claim 1, wherein each RDC instantiation implements a second plurality of NFs, comprising: an accessibility and mobility management function (AMF), a user plane function (UPF), and a session management function (SMF).

3. The hybrid cloud cellular network of claim 1, wherein at least one RDC instantiation of the plurality of RDC instantiations is implemented at different data center group at which no NDC instantiation of the plurality of NDC instantiations is executed.

4. The hybrid cloud cellular network of claim 1, wherein the cloud computing platform is a public cloud computing platform.

5. The hybrid cloud cellular network of claim 1, further comprising a plurality of edge data centers (EDC) instantiations, wherein each EDC instantiation of the plurality of EDC instantiations is executed at a data center separate from data centers used for the plurality of NDC instantiations.

6. The hybrid cloud cellular network of claim 1, wherein the plurality of NFs comprises: a network slice selection function (NSSF), a network exposure function (NEF), a security edge protection proxy (SEPP), a binding support function (BSF), a policy control function (PCF), a charging function (CHF), a service communication proxy (SCP), and a short message service function (SMSF).

7. The hybrid cloud cellular network of claim 1, wherein a first instance of a NF at a first NDC instantiation within the first data center group region provides geographic redundancy for a second instance of the NF at a second NDC instantiation within the second data center group region.

8. The hybrid cloud cellular network of claim 1, wherein each BS of the plurality of BSs comprises: an antenna, a radio unit (RUs), and a distributed unit (DU).

9. The hybrid cloud cellular network of claim 1, wherein each NDC instantiation within a regional data center cluster is communicatively coupled with each RDC instantiation within its data center group region.

10. The hybrid cloud cellular network of claim 1, wherein the cellular network database function is a universal data repository (UDR) that stores data for the plurality of NFs.

11. The hybrid cloud cellular network of claim 1, wherein the hybrid cloud cellular network is a 5G New Radio (NR) cellular network.

12. A method comprising:
    establishing a plurality of national data center (NDC) instantiations and a plurality of regional data center (RDC) instantiations on a cloud computing platform, wherein:
    the cloud computing platform is communicatively connected with a radio access network (RAN);

a first set of NDC instantiations of the plurality of NDC instantiations is executed in a first data center group region of the cloud computing platform and a second set of NDC instantiations of the plurality of NDC instantiations is executed in a second data center group region of the cloud computing platform; and at least one RDC instantiation of the plurality of RDC instantiations is implemented at a same data center group at which an NDC instantiation of the plurality of NDC instantiations is implemented;

executing, within each NDC instantiation of the plurality of NDC instantiations, a plurality of network functions (NFs);

executing, within each NDC instantiation of the plurality of NDC instantiations, an instance of a cellular network database function on the cloud computing platform, wherein each instance of the cellular network database function updates each other instance of the cellular network database function across the plurality of NDC instantiations; and processing cellular network core traffic for the RAN using the plurality of NDC instantiations including the plurality of NFs and the cellular network database function.

13. The method of claim 12, wherein establishing the plurality of RDC instantiations further comprises establishing at least one RDC instantiation of the plurality of RDC instantiations at a different data center group at which no NDC instantiation of the plurality of NDC instantiations is established.

14. The method of claim 12, further comprising: establishing a plurality of edge data center (EDC) instantiations on the cloud computing platform.

15. The method of claim 12, wherein the plurality of NFS comprises: a network slice selection function (NSSF), a network exposure function (NEF), a security edge protection proxy (SEPP), a binding support function (BSF), a policy control function (PCF), a charging function (CHF), a service communication proxy (SCP), and a short message service function (SMSF).

16. The method of claim 12, wherein each RDC instantiation implements a second plurality of NFs, comprising: an accessibility and mobility management function (AMF), a user plane function (UPF), and a session management function (SMF).

17. A cloud cellular network system, comprising:
a plurality of national data center (NDC) instantiations on a cloud computing platform, wherein:
the cloud computing platform is communicatively connected with a radio access network (RAN), comprising a plurality of base stations; and
a first set of NDC instantiations of the plurality of NDC instantiations is executed in a first data center group region of the cloud computing platform and a second set of NDC instantiations of the plurality of NDC instantiations is executed in a second data center group region of the cloud computing platform;
a plurality of network functions (NFs), wherein an instance of each NF is executed within each NDC instantiation of the plurality of NDC instantiations;
a cellular network database function, wherein:
an instance of the cellular network database function is executed within each NDC instantiation of the plurality of NDC instantiations; and
each instance of the cellular network database function updates each other instance of the cellular network database function across the plurality of NDC instantiations; and
a plurality of regional data center (RDC) instantiations, wherein at least one RDC instantiation of the plurality of RDC instantiations is implemented at a same data center group at which an NDC instantiation of the plurality of NDC instantiations is implemented.

* * * * *